United States Patent
Bushnell et al.

(10) Patent No.: US 12,104,929 B2
(45) Date of Patent: *Oct. 1, 2024

(54) ROTATABLE CROWN FOR AN ELECTRONIC DEVICE

(71) Applicant: Apple Inc., Cupertino, CA (US)

(72) Inventors: Tyler S. Bushnell, Mountain View, CA (US); Adam T. Clavelle, San Francisco, CA (US); Christopher M. Werner, San Jose, CA (US); Colin M. Ely, Sunnyvale, CA (US); Stephen N. Sweet, San Jose, CA (US); Sriram Moorthy, Sunnyvale, CA (US); Huan Peng, San Jose, CA (US)

(73) Assignee: Apple Inc., Cupertino, CA (US)

(*) Notice: Subject to any disclaimer, the term of this patent is extended or adjusted under 35 U.S.C. 154(b) by 884 days.

This patent is subject to a terminal disclaimer.

(21) Appl. No.: 16/750,946

(22) Filed: Jan. 23, 2020

(65) Prior Publication Data

US 2020/0159172 A1    May 21, 2020

Related U.S. Application Data

(63) Continuation of application No. 15/597,145, filed on May 16, 2017, now Pat. No. 10,551,798.

(Continued)

(51) Int. Cl.
*G04G 21/00*    (2010.01)
*G01D 5/165*    (2006.01)
(Continued)

(52) U.S. Cl.
CPC ........ *G01D 5/1655* (2013.01); *G01D 5/2412* (2013.01); *G04B 3/04* (2013.01); *G04G 21/00* (2013.01)

(58) Field of Classification Search
CPC ........ G04G 21/00; G04B 3/04; H01H 19/003; H01H 19/62; H01H 19/626; G01D 5/1655; G01D 5/2412

See application file for complete search history.

(56) References Cited

U.S. PATENT DOCUMENTS

| 2,237,860 A | 4/1941 | Bolle |
| 2,288,215 A | 6/1942 | Taubert et al. |

(Continued)

FOREIGN PATENT DOCUMENTS

| CN | 1601408 | 3/2005 |
| CN | 1825224 | 8/2006 |

(Continued)

OTHER PUBLICATIONS

U.S. Appl. No. 16/399,868, filed Apr. 30, 2020, pending.

(Continued)

*Primary Examiner* — Sean Kayes
(74) *Attorney, Agent, or Firm* — Brownstein Hyatt Farber Schreck, LLP

(57) ABSTRACT

A compact crown for an electronic device such as an electronic watch, including a set of wipers capable of determining a rotation angle, rotation direction, or rotation speed, is disclosed. The set of wipers is in contact with at least one resistance member at different angular positions around a rotation axis. The crown may have a group of ground taps disposed along the resistance member and a measured signal may vary based on the position of each wiper as it contacts the at least one resistance member. A compact crown may also include capacitive members and capacitive sensors in order to similarly determine rotation angle, rotation direction, or rotation speed.

21 Claims, 25 Drawing Sheets

Related U.S. Application Data

(60) Provisional application No. 62/337,804, filed on May 17, 2016.

(51) Int. Cl.
  *G01D 5/241* (2006.01)
  *G04B 3/04* (2006.01)

(56) References Cited

U.S. PATENT DOCUMENTS

| | | | |
|---|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 3,937,002 A | 2/1976 | Haften |
| 4,007,347 A | 2/1977 | Haber |
| 4,031,341 A | 6/1977 | Wuthrich et al. |
| 4,037,068 A | 7/1977 | Gaynor |
| 4,051,665 A | 10/1977 | Arn |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,274,152 A | 6/1981 | Ikegami |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,559,761 A | 9/1996 | Frenkel et al. |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,738,104 A | 4/1998 | Lo |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 * | 4/2002 | Isikawa .............. G05G 9/047 345/161 |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,950,695 B2 | 9/2005 | Chen |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,009,915 B2 | 3/2006 | Brewer et al. |
| 7,016,263 B2 | 3/2006 | Gueissaz et al. |
| 7,021,442 B2 | 4/2006 | Borgerson |
| 7,031,228 B2 | 4/2006 | Born et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,111,365 B1 | 9/2006 | Howie, Jr. |
| 7,113,450 B2 | 9/2006 | Plancon et al. |
| 7,119,289 B2 | 10/2006 | Lacroix |
| 7,135,673 B2 | 11/2006 | Saint Clair |
| 7,167,083 B2 | 1/2007 | Giles |
| 7,187,359 B2 | 3/2007 | Numata |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |

(56) References Cited

U.S. PATENT DOCUMENTS

| | | | |
|---|---|---|---|
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,474,592 B2 | 1/2009 | Lyon |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 * | 2/2010 | Akieda | H01C 10/24 |
| | | | 200/6 R |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,717,151 B2 | 5/2014 | Forutanpour et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,810,514 B2 | 8/2014 | Zhao et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,091,309 B2 | 7/2015 | Battlogg |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,552,023 B2 | 1/2017 | Joo et al. |
| 9,599,964 B2 | 3/2017 | Gracia |
| 9,600,071 B2 | 3/2017 | Rothkopf |
| 9,606,721 B2 | 3/2017 | Park et al. |
| 9,607,505 B2 | 3/2017 | Othkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,632,537 B2 | 4/2017 | Memering |

(56) References Cited

U.S. PATENT DOCUMENTS

| | | |
|---|---|---|
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |
| 9,709,956 B1 | 7/2017 | Ely et al. |
| 9,753,436 B2 | 9/2017 | Ely et al. |
| D800,172 S | 10/2017 | Akana |
| 9,800,717 B2 | 10/2017 | Ma et al. |
| 9,836,025 B2 | 12/2017 | Ely et al. |
| 9,873,711 B2 | 1/2018 | Hoover et al. |
| 9,874,945 B2 | 1/2018 | Fukumoto |
| 9,886,006 B2 | 2/2018 | Ely et al. |
| 9,891,590 B2 | 2/2018 | Shim et al. |
| 9,891,651 B2 | 2/2018 | Jackson et al. |
| 9,891,667 B2 | 2/2018 | Jung et al. |
| 9,898,032 B2 | 2/2018 | Hafez et al. |
| 9,913,591 B2 | 3/2018 | Lapetina et al. |
| 9,921,548 B2 | 3/2018 | Mitani |
| 9,927,902 B2 | 3/2018 | Burr et al. |
| 9,939,923 B2 | 4/2018 | Sharma |
| 9,946,297 B2 | 4/2018 | Nazzaro et al. |
| 9,952,558 B2 | 4/2018 | Ely |
| 9,952,682 B2 | 4/2018 | Zhang et al. |
| 9,971,305 B2 | 5/2018 | Ely et al. |
| 9,971,405 B2 | 5/2018 | Holenarsipur et al. |
| 9,971,407 B2 | 5/2018 | Holenarsipur et al. |
| 9,979,426 B2 | 5/2018 | Na et al. |
| 10,001,817 B2 | 6/2018 | Zambetti et al. |
| 10,012,550 B2 | 7/2018 | Yang |
| 10,018,966 B2 | 7/2018 | Ely et al. |
| 10,019,097 B2 | 7/2018 | Ely et al. |
| 10,037,006 B2 | 7/2018 | Ely |
| 10,037,081 B2 | 7/2018 | Grant |
| 10,048,802 B2 | 8/2018 | Shedletsky |
| 10,057,470 B2 | 8/2018 | Kim et al. |
| 10,061,399 B2 | 8/2018 | Bushnell et al. |
| 10,066,970 B2 | 9/2018 | Gowreesunker et al. |
| 10,092,203 B2 | 10/2018 | Mirov |
| 10,108,016 B2 | 10/2018 | Bosveld |
| 10,114,342 B2 | 10/2018 | Kim et al. |
| 10,145,711 B2 | 12/2018 | Boonsom et al. |
| 10,175,652 B2 | 1/2019 | Ely et al. |
| 10,190,891 B1 | 1/2019 | Rothkopf et al. |
| 10,191,455 B2 | 1/2019 | Shim et al. |
| 10,203,662 B1 | 2/2019 | Lin et al. |
| 10,209,148 B2 | 2/2019 | Lyon et al. |
| 10,216,147 B2 | 2/2019 | Ely et al. |
| 10,222,755 B2 | 3/2019 | Coakley et al. |
| 10,222,756 B2 | 3/2019 | Ely et al. |
| 10,222,909 B2 | 3/2019 | Shedletsky et al. |
| 10,234,828 B2 | 3/2019 | Ely et al. |
| 10,241,593 B2 | 3/2019 | Chen |
| 10,296,125 B2 | 5/2019 | Ely et al. |
| 10,331,081 B2 | 6/2019 | Ely et al. |
| 10,331,082 B2 | 6/2019 | Ely et al. |
| 10,332,111 B2 | 6/2019 | Mokhasi et al. |
| 10,353,487 B2 | 7/2019 | Chung et al. |
| 10,379,629 B2 | 8/2019 | Bushnell et al. |
| 10,386,940 B2 | 8/2019 | Kim |
| 10,401,961 B2 | 9/2019 | Cruz-Hernandez et al. |
| 10,429,959 B2 | 10/2019 | Battlogg |
| 10,444,040 B2 | 10/2019 | Ruh |
| 10,474,194 B1 | 11/2019 | Ell et al. |
| 10,503,258 B2 | 12/2019 | Holenarsipur et al. |
| 10,509,486 B2 | 12/2019 | Bushnell et al. |
| 10,524,671 B2 | 1/2020 | Lamego |
| 10,534,320 B2 | 1/2020 | Ferri et al. |
| 10,551,798 B1 * | 2/2020 | Bushnell ............ G04B 3/04 |
| 10,593,617 B2 | 3/2020 | Ashikaga et al. |
| 10,599,101 B2 * | 3/2020 | Rothkopf ............ A61B 5/0295 |
| 10,610,157 B2 | 4/2020 | Pandya et al. |
| 10,765,019 B2 | 9/2020 | Werner et al. |
| 10,840,041 B1 | 11/2020 | Harms |
| 10,845,764 B2 | 11/2020 | Ely et al. |
| 10,852,700 B2 | 12/2020 | Abramov |
| 10,852,855 B2 | 12/2020 | Niu |
| 10,871,385 B2 | 12/2020 | Kok |
| 10,884,549 B2 | 1/2021 | Shedletsky et al. |
| 10,936,071 B2 | 3/2021 | Pandya et al. |
| 10,942,491 B2 | 3/2021 | Rothkopf |
| 10,948,880 B2 | 3/2021 | Ely et al. |
| 10,955,937 B2 | 3/2021 | Bushnell et al. |
| 11,148,292 B2 | 3/2021 | Bryner et al. |
| 10,987,054 B2 | 4/2021 | Pandya et al. |
| 11,000,193 B2 | 5/2021 | Tal et al. |
| 11,029,831 B2 | 6/2021 | Block et al. |
| 11,036,318 B2 | 6/2021 | Bokma et al. |
| 11,181,863 B2 | 11/2021 | Ely et al. |
| 11,194,298 B2 | 12/2021 | Roach et al. |
| 11,221,590 B2 | 1/2022 | Rothkopf et al. |
| 11,347,189 B1 | 5/2022 | Herrera et al. |
| 11,350,869 B2 | 6/2022 | Rasmussen et al. |
| 11,360,440 B2 | 6/2022 | Perkins et al. |
| 11,385,599 B2 | 7/2022 | Ely et al. |
| 11,429,256 B2 | 8/2022 | Ham |
| 11,432,766 B2 | 9/2022 | Pandya et al. |
| 11,451,084 B2 | 9/2022 | Park |
| 11,474,483 B2 | 10/2022 | Rothkopf et al. |
| 11,513,613 B2 | 11/2022 | Bushnell et al. |
| 11,531,306 B2 | 12/2022 | Ely et al. |
| 11,567,457 B2 | 1/2023 | Rothkopf et al. |
| 2002/0101457 A1 | 8/2002 | Lang |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0182708 A1 | 8/2007 | Poupyrev et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0242569 A1 | 10/2007 | Inoue |
| 2007/0247421 A1 | 10/2007 | Orsley et al. |
| 2008/0112275 A1 * | 5/2008 | Born ............ G04C 3/004 368/319 |
| 2008/0130914 A1 | 6/2008 | Cho |
| 2009/0051649 A1 | 2/2009 | Rondel |
| 2009/0073119 A1 | 3/2009 | Le et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Harvill |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie |
| 2014/0045547 A1 | 2/2014 | Singamsetty et al. |
| 2014/0071098 A1 | 3/2014 | You |

(56) References Cited

U.S. PATENT DOCUMENTS

| | | |
|---|---|---|
| 2014/0073486 A1 | 3/2014 | Ahmed et al. |
| 2014/0132516 A1 | 5/2014 | Tsai et al. |
| 2014/0173784 A1 | 5/2014 | Mistry |
| 2014/0197936 A1 | 7/2014 | Biggs et al. |
| 2014/0328147 A1* | 11/2014 | Yang .................. G04C 3/008 368/69 |
| 2014/0340318 A1 | 11/2014 | Stringer et al. |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0168178 A1* | 6/2015 | Hoover ................ G01D 5/3473 368/321 |
| 2015/0186609 A1 | 7/2015 | Utter, II |
| 2015/0221460 A1 | 8/2015 | Teplitxky et al. |
| 2015/0293592 A1 | 10/2015 | Cheong |
| 2015/0320346 A1 | 11/2015 | Chen |
| 2015/0338642 A1 | 11/2015 | Sanford |
| 2015/0366098 A1 | 12/2015 | Lapetina et al. |
| 2016/0018846 A1 | 1/2016 | Zenoff |
| 2016/0054813 A1 | 2/2016 | Schediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253487 A1 | 9/2016 | Sarkar et al. |
| 2016/0306446 A1 | 10/2016 | Chung et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2016/0378071 A1 | 12/2016 | Rothkopf et al. |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0045958 A1 | 2/2017 | Battlogg et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0319082 A1 | 11/2017 | Sayme |
| 2017/0331869 A1 | 11/2017 | Bendahan et al. |
| 2017/0357465 A1 | 12/2017 | Dzeryn et al. |
| 2018/0059624 A1* | 3/2018 | James .................. G04B 47/06 |
| 2018/0136686 A1 | 5/2018 | Jackson et al. |
| 2018/0196517 A1 | 7/2018 | Tan et al. |
| 2018/0225701 A1 | 8/2018 | Han |
| 2018/0235491 A1 | 8/2018 | Bayley et al. |
| 2018/0239306 A1 | 8/2018 | Ely |
| 2018/0364815 A1 | 12/2018 | Moussette et al. |
| 2019/0017846 A1 | 1/2019 | Boonsom et al. |
| 2019/0025940 A1 | 1/2019 | Shim et al. |
| 2019/0056700 A1 | 2/2019 | Matsuno |
| 2019/0072911 A1 | 3/2019 | Ely et al. |
| 2019/0163324 A1 | 5/2019 | Shedletsky |
| 2019/0250754 A1 | 8/2019 | Ely et al. |
| 2019/0278232 A1 | 9/2019 | Ely et al. |
| 2019/0294117 A1 | 9/2019 | Ely et al. |
| 2019/0317454 A1 | 10/2019 | Holenarsipur et al. |
| 2019/0391539 A1 | 12/2019 | Perkins et al. |
| 2020/0041962 A1 | 2/2020 | Beyhs |
| 2020/0064774 A1 | 2/2020 | Ely et al. |
| 2020/0064779 A1 | 2/2020 | Pandya et al. |
| 2020/0073339 A1 | 3/2020 | Roach et al. |
| 2020/0085331 A1 | 3/2020 | Chou |
| 2020/0110473 A1 | 4/2020 | Bushnell et al. |
| 2020/0233380 A1 | 7/2020 | Rothkopf |
| 2020/0233529 A1 | 7/2020 | Shedletsky et al. |
| 2021/0157278 A1 | 5/2021 | Xue |
| 2021/0181682 A1 | 6/2021 | Ely et al. |
| 2021/0181691 A1 | 6/2021 | Rothkopf et al. |
| 2021/0181692 A1 | 6/2021 | Rothkopf et al. |
| 2021/0255590 A1 | 8/2021 | Ely et al. |
| 2021/0303081 A1 | 9/2021 | Kuboyama et al. |
| 2021/0353226 A1 | 11/2021 | Hiemstra |
| 2021/0405594 A1 | 12/2021 | Holenarsipur et al. |
| 2022/0043397 A1 | 2/2022 | Ely et al. |
| 2022/0043402 A1 | 2/2022 | Roach et al. |
| 2022/0075328 A1 | 3/2022 | Taylor |
| 2022/0261111 A1 | 8/2022 | Shedletsky et al. |
| 2022/0299944 A1 | 9/2022 | Ely |
| 2022/0326660 A1 | 10/2022 | Perkins |
| 2023/0012897 A1 | 1/2023 | Bushnell et al. |
| 2023/0013283 A1 | 1/2023 | Herrera et al. |
| 2023/0028554 A1 | 1/2023 | Rothkopf et al. |
| 2023/0077241 A1 | 3/2023 | Pandya et al. |
| 2023/0097827 A1 | 3/2023 | Rothkopf et al. |
| 2023/0101015 A1 | 3/2023 | Ely et al. |
| 2023/0161299 A1 | 5/2023 | Behys |
| 2023/0213893 A1 | 7/2023 | Rothkopf et al. |

FOREIGN PATENT DOCUMENTS

| | | |
|---|---|---|
| CN | 101035148 | 9/2007 |
| CN | 101404928 | 4/2009 |
| CN | 102067070 | 5/2011 |
| CN | 102216959 | 10/2011 |
| CN | 102590925 | 7/2012 |
| CN | 102741772 | 10/2012 |
| CN | 103177891 | 6/2013 |
| CN | 103919536 | 7/2014 |
| CN | 203705837 | 7/2014 |
| CN | 104020660 | 9/2014 |
| CN | 204479929 | 7/2015 |
| CN | 204496177 | 7/2015 |
| CN | 104898406 | 9/2015 |
| CN | 105022947 | 11/2015 |
| CN | 105339871 | 2/2016 |
| CN | 105556433 | 5/2016 |
| CN | 105683876 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| CN | 209625187 | 11/2019 |
| CN | 114220694 | 3/2022 |
| CN | 106125968 | 11/2022 |
| EP | 0165548 | 12/1985 |
| EP | 1519452 | 3/2005 |
| EP | 2579186 | 4/2013 |
| JP | S52164551 | 12/1977 |
| JP | S53093067 | 8/1978 |
| JP | S60103936 | 6/1985 |
| JP | S60103937 | 6/1985 |

(56) References Cited

FOREIGN PATENT DOCUMENTS

| | | |
|---|---|---|
| JP | H07116141 | 5/1995 |
| JP | H0914941 | 1/1997 |
| JP | 2000258559 | 9/2000 |
| JP | 2000316824 | 11/2000 |
| JP | 2001215288 | 8/2001 |
| JP | 2001524206 | 11/2001 |
| JP | 2002071480 | 3/2002 |
| JP | 2002165768 | 6/2002 |
| JP | 2004028979 | 11/2004 |
| JP | 2005099023 | 4/2005 |
| JP | 2006101505 | 4/2006 |
| JP | 3852854 | 12/2006 |
| JP | 2007101380 | 4/2007 |
| JP | 2007285748 | 10/2007 |
| JP | 2009009382 | 1/2009 |
| JP | 2009519737 | 5/2009 |
| JP | 2009540399 | 11/2009 |
| JP | 2010515153 | 5/2010 |
| JP | 2011021929 | 2/2011 |
| JP | 2011221659 | 11/2011 |
| JP | 2012053801 | 3/2012 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2017219448 | 12/2017 |
| JP | 2018510451 | 4/2018 |
| KR | 200278568 | 3/2002 |
| KR | 20080028935 | 4/2008 |
| KR | 100849684 | 8/2008 |
| KR | 20110103761 | 9/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160048967 | 5/2016 |
| KR | 20170106395 | 9/2017 |
| WO | WO2003/032538 | 4/2003 |
| WO | WO2016080669 | 5/2016 |
| WO | WO2016196171 | 12/2016 |
| WO | WO2016208835 | 12/2016 |
| WO | WO2020173085 | 9/2020 |

OTHER PUBLICATIONS

U.S. Appl. No. 16/872,600, filed May 12, 2020, pending.
U.S. Appl. No. 16/890,880, filed Jun. 2, 2020, pending.
Author Unknown, "Desirable Android Wear smartwatch from LG," Gulf News, Dubai, 3 pages, Jan. 30, 2015.
Author Unknown, "Fossil Q ups smartwatch game with handsome design and build," Business Mirror, Makati City, Philippines, 3 pages, Dec. 20, 2016.
Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.
Author Unknown, "mHealth," http://mhealth.vesag.com/?m=201012, 7 pages, Dec. 23, 2010.
Author Unknown, "mHealth Summit 2010," http://www.virtualpressoffice.com/eventsSubmenu.do?page=exhibitorPage&showId=1551&companyId=5394, 5 pages, Nov. 18, 2010.
Author Unknown, "MyKronoz ZeTime: World's Most Funded Hybrid Smartwatch Raised over $3M on Kickstarter, Running until Apr. 27," Business Wire, New York, New York, 3 pages, Apr. 21, 2017.
Author Unknown, "RedEye mini Plug-in Universal Remote Adapter for iPhone, iPod touch and iPad," Amazon.com, 4 pages, date unknown.
Author Unknown, "Re iPhone Universal Remote Control—Infrared Remote Control Accessory for iphone and ipod touch," http://www.amazon.com/iPhone-Universal-Remote-Control-Accessory/dp/tech-data/B0038Z4 . . . , 2 pages, at least as early as Jul. 15, 2010.
Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.
Author Unknown, "Vyzin Electronics Private Limited launches Vesag Watch," http://www.virtualpressoffice.com/showJointPage.do?page=jp&showId=1544, 5 pages, Jan. 6, 2011.
Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
Author Unknown, "DeskThorityNet, Optical Switch Keyboards," http://deskthority.net/keyboards-f2/optical-switch-keyboards-t1474.html, 22 pages, Jul. 11, 2015.
Epstein et al., "Economical, High-Performance Optical Encoders," Hewlett-Packard Journal, pp. 99-106, Oct. 1988. [text only version].
GreyB, "Google Watch: Convert your arm into a keyboard," http://www.whatafuture.com/2014/02/28/google-smartwatch/#sthash.Yk35cDXK.dpbs, 3 pages, Feb. 28, 2014.
IBM, "Additional Functionality Added to Cell Phone via "Learning" Function Button," www.ip.com, 2 pages, Feb. 21, 2007.
Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.
Krishnan et al., "A Miniature Surface Mount Reflective Optical Shaft Encoder," Hewlett-Packard Journal, Article 8, pp. 1-6, Dec. 1996.
Rick, "How VESAG Helps Health Conscious Citizens," http://sensetekgroup.com/2010/11/29/wireless-health-monitoring-system/, 2 pages, Nov. 29, 2010.
Sadhu, Rajendra, "How VESAG Helps People Who Want to 'Be There'?," http://ezinearticles.com/?How-Vesag-Helps-People-Who-Want-to-Be-There?&id=5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.
Narayanaswami et al., "Challenges and considerations for the design and production of a purpose-optimized body-worn wrist-watch computer," Defense, Security, and Cockpit Displays, 2004.
M.T. Raghunath et al., User Interfaces for Applications on a Wrist Watch, Personal and Ubiquitous Computing, vol. 6, No. 1, 2002, Springer.31.
U.S. Appl. No. 18/217,944, filed Jul. 3, 023; pending.
U.S. Appl. No. 18/232,660, filed Aug. 10, 2023; pending.
U.S. Appl. No. 17/840,222, filed Jun. 14, 2022; pending.
U.S. Appl. No. 18/106,912, filed Feb. 7, 2023; pending.

\* cited by examiner

ROTATABLE CROWN FOR AN ELECTRONIC DEVICE

CROSS-REFERENCE TO RELATED APPLICATION(S)

This application is a continuation of U.S. patent application Ser. No. 15/597,145, filed May 16, 2017, and titled "Rotatable Crown for an Electronic Device," which is a nonprovisional patent application of and claims the benefit of U.S. Provisional Patent Application No. 62/337,804, filed May 17, 2016, and titled "Compact Rotary Encoder," the disclosures of which are hereby incorporated herein by reference in their entirety.

FIELD

The described embodiments relate generally to compact crowns for electronic devices such as electronic watches. More particularly, the present embodiments relate to a crown having (or taking the form of) a high-resolution rotary encoder that detects a rotation angle or relative amount of motion using an output from two or more angularly offset wipers.

BACKGROUND

In computing systems, a rotary encoder may be employed to detect an angular position or motion of a shaft. Many traditional rotary encoders use optical sensing of indicia placed around a circumference of an encoder surface or wheel. The precision of such rotary encoders is therefore limited by the minimum achievable size and spacing of the indicia. Optical sensing of indicia may also limit the ability of a traditional rotary encoder to detect a direction of rotation of a rotatable shaft of the encoder.

SUMMARY

Embodiments of the present invention are directed to a crown for an electronic device, which crown may be configured to determine an angular position, direction of rotation, or speed of rotation of a user-rotatable shaft or other user-rotatable element, for example, to control a function of the electronic device. The controlled function may include, for example, a graphical output of a display on the electronic device or a volume of an audio output of the electronic device.

In a first aspect, the present disclosure describes an electronic watch. The electronic watch includes a housing; a crown at least partially positioned within the housing and configured to receive rotational and translational input from a user, and comprising: a shaft; a resistance member; and a set of wipers affixed to the shaft and operative to travel along the resistance member during rotation of the shaft, the set of wipers providing an output based on multiple contact points between the set of wipers and the resistance member; a display positioned at least partially within the housing and configured to depict a graphic in response to at least one of the rotational or translational input; an analog-to-digital converter electrically connected to the set of wipers, the analog-to-digital converter configured to provide a digital output corresponding to the output; and a processor configured to determine an angular position, direction of rotation, or speed of rotation of the shaft using the digital output, and to manipulate the graphic in response to the determined angular position, direction of rotation, or speed of rotation; wherein each wiper divides a resistance of the resistance member at each contact point, and a voltage at each contact point of the multiple contact points varies in response to rotation of the shaft.

Another aspect of the present disclosure may take the form of a method for controlling an electronic watch, comprising: receiving an output signal from a crown of the electronic watch; identifying, based on the output signal, a first angle of rotation of a first wiper of the crown about an axis of a shaft of the crown, the first wiper in contact with a resistive track or a conductive output track of the crown; identifying, based on the output signal, a second angle of rotation of a second wiper of the crown about an axis of the shaft of the crown, the second wiper in contact with the resistive track; and controlling a function of the electronic watch based on at least one of the first and second angles of rotation.

Still another aspect of the disclosure may take the form of a crown for an electronic watch, comprising: a resistance member on a contact surface; a user-rotatable shaft; an array of ground taps separating the resistance member into segments of uniform resistivity; a first wiper and a second wiper affixed to the user-rotatable shaft, the first wiper configured to generate a first output and the second wiper configured to generate a second output based on a relative position of the first wiper or the second wiper with respect to the resistance member; and a processor configured to determine at least one of an angular position, a direction of rotation, or a speed of rotation of the user-rotatable shaft based on the first output and the second output, wherein the first wiper and the second wiper are affixed to the user-rotatable shaft such that the first wiper contacts the resistance member at a first segment that is distinct from a second segment contacted by the second wiper.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
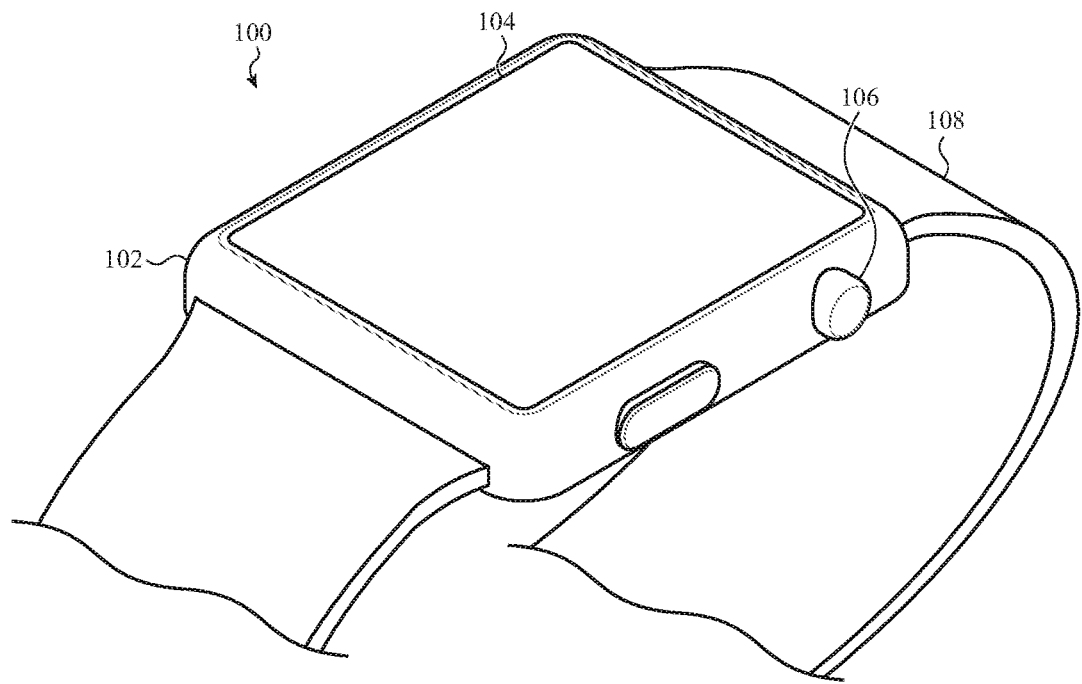
FIG. 1 shows a sample electronic device that may incorporate a rotary encoder in the form of a crown, as described herein.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a compact rotary encoder capable of high resolution output for use in an electronic device such as an electronic watch. More particularly, the rotary encoder may be used as, or connected to, a crown of an electronic watch. The crown may function as an input device of the electronic device, and may be selectively rotated about an axis. The relative rotation around the axis may be used to control a feature, interface, or other mechanism of the electronic device. The high resolution of the rotary encoder, functioning as a crown (or as part of a crown), may allow for precise control of an electronic device. In some examples, the rotary encoder may control or vary any or all of: a graphic shown on a display on the electronic device; a function of the electronic device; a haptic output of the electronic device; and/or a volume of an audio output of the electronic device.

In an embodiment, the crown (e.g., rotary encoder) may have a user-rotatable shaft, at least two arms extending radially from the shaft and separated by an angle, and a wiper or slider coupled to each arm. Each wiper may extend from the arm at an angle and contact at least one resistance member on a contact surface of a rotary encoder base. In some embodiments, the arms may extend at a non-right angle from the shaft. In some examples, the arms may be replaced by one or more rotors, or by a portion of the shaft that extends outward from an axis of the crown, which portion provides or supports the wipers, sliders, or other electrical contact members. The contact surface may also have a group of ground taps electrically coupled to the resistance member and at least one conductive element disposed radially around the shaft. In some embodiments, the resistance member may form a circle, track, path, or the like. Further, the resistance member may be divided into multiple segments.

As the shaft is rotated about its axis (e.g., by a user), each wiper contacts a different portion of the resistance member and experiences a variable resistance as a result of the wiper "dividing" a portion of the resistance member between ground points into at least two segments. That is, as the shaft rotates, the wiper varies the length of segments of the resistance member between the wiper contact point and grounded points disposed around the resistance member. The output signals for each wiper may be detected and monitored by a processor to determine a rotation angle (i.e., angle of rotation or angular position), rotation direction (i.e., direction of rotation), or rotation speed (i.e., speed of rotation) around the shaft axis.

In some embodiments, the at least two arms (or the at least two contact members that are otherwise affixed to the shaft) are separated by an angle. This may cause each respective wiper to contact the resistance member at points at which the output signals are out of phase. The particular angle of separation for the arms (or contact members) may be chosen such that the output signals from the wipers, when plotted as a function of the rotation angle, are signals in quadrature (e.g., signals separated by a predetermined offset). Accordingly, by determining the phase difference between signals from the respective wipers, a direction of rotation can be determined.

In another embodiment, the rotary encoder/crown may have a shaft and at least two capacitive members extending radially from the shaft and separated by an angle. The capacitive members may rotate above the base of the rotary encoder member. The base of the rotary encoder/crown may include a set of capacitance sensors positioned on a sensing surface beneath the shaft. The capacitance sensors may be coaxial with the shaft. The capacitance sensors may detect a capacitance between themselves and the capacitive members. As the shaft rotates, the capacitive members may pass over the capacitive sensors. Capacitance between a capacitive member and a capacitive sensor increases as overlap between the member and sensor increases, and decreases as overlap decreases. The capacitive member may revolve as the shaft rotates, thereby varying the overlap of the capacitive member with respect to the capacitive sensor. As the shaft rotates, this overlap may vary from zero to full, or anywhere in between.

The capacitive members and the group of capacitance sensors may be configured to maintain a constant separation during rotation of the capacitive members around the shaft axis. The output signals of the capacitance sensors may be detected and monitored by a processor to determine a rotation angle, rotation direction, or rotation speed of the shaft around the shaft axis.

These and other embodiments are discussed below with reference to FIGS. 1-21. However, those skilled in the art will readily appreciate that the detailed description given herein with respect to these Figures is for explanatory purposes only and should not be construed as limiting.

Turning now to the figures, FIG. 1 illustrates an electronic device 100 such as a wearable electronic device, timekeeping device, portable computing device, mobile phone, touch-sensitive input, or the like. The electronic device 100 may have a housing 102 defining a body, a display 104 configured to depict a graphical output of the electronic device 100, and at least one input device or selection device 106. An input device 106 may be positioned at least partially within the housing 102 and may project through the housing so that a user may manipulate the input device (for example, by rotating it). Likewise, the display 104 may be positioned at least partially within the housing 102 and may be accessible by, and visible to, a user. The user may view information presented on the display and may touch the display to provide a touch or force input. As one example, the user may select (or otherwise interact with) a graphic, icon, or the like presented on the display by touching or pressing on the display at the location of the graphic.

The electronic device 100 may have a band 108 for securing the electronic device 100 to a user, another electronic device, a retaining mechanism, and so on. In some embodiments, the electronic device 100 may be an electronic watch, the body defined by the housing 102 may be a watch body, and the input device 106 may be a crown of the electronic watch. The crown may extend from an exterior to an interior of the electronic device housing. The crown may be configured to receive rotational and translational input from a user. The input device 106 may include a scroll wheel, knob, dial, or the like that may be operated by a user of the electronic device 100. Some embodiments of the electronic device 100 may lack the band 108, display 104, or both.

Figure 2:
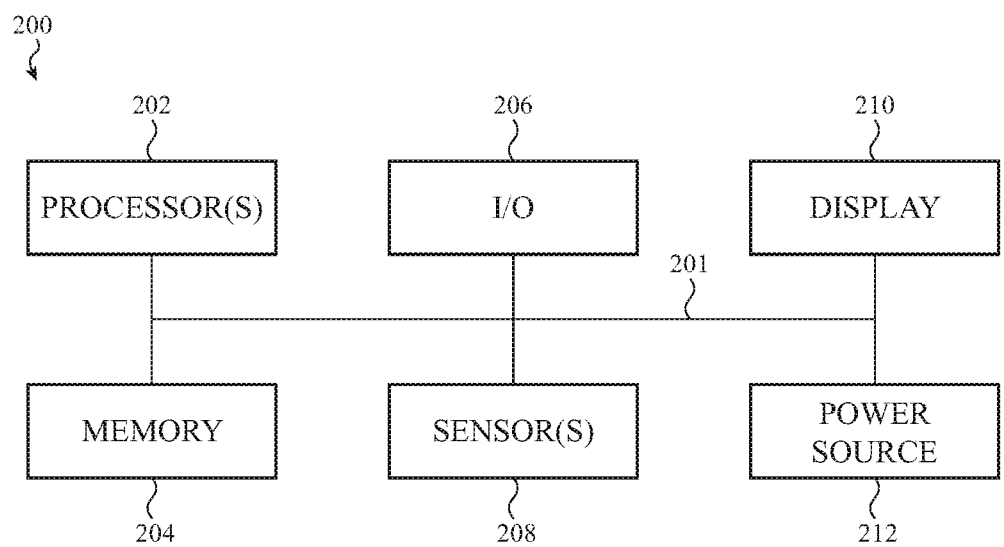
FIG. 2 shows an electrical block diagram of the electronic device of FIG. 1.

The electronic device 100 may include a number of internal components. FIG. 2 illustrates a simplified block diagram 200 of the electronic device 100. The electronic device 100 may include, by way of non-limiting example, one or more processors 202, a storage or memory 204, an input/output interface 206, a display 210, a power source 212, and one or more sensors 208, each of which will be discussed in turn below.

The processor 202 may control operation of the electronic device 100. The processor 202 may be in communication, either directly or indirectly, with substantially all of the components of the electronic device 100. For example, one or more system buses 201 or other communication mechanisms may provide communication between the processor 202, the display 210, the input/output interface 206, the sensors 208, and so on. The processor 202 may be any electronic device capable of processing, receiving, and/or transmitting instructions. For example, the processor 202 may be a microprocessor or a microcomputer. As described herein, the term "processor" is meant to encompass a single processor or processing unit, multiple processors, or multiple processing units, or other suitably configured computing element(s).

In some examples, the function(s) of the electronic device 100 controlled by the processor 202 may include a graphical output of a display 210 on the electronic device 100. For example, in response to detecting rotation of the input device 106 (e.g., a changed angular position, direction of rotation, or speed of rotation of a rotary encoder, which rotary encoder may be a crown or part of a crown), the processor 202 may change or manipulate (e.g., scroll, zoom, pan, move, etc.) a graphic depicted on the display 210. Scrolling may be within a graphic (e.g., a photo or map), within text and/or images of a document or web page (which are specific examples of graphics), within an array of graphics representing applications or functions that may be selected, launched, and so on. The processor 202 may cause graphics on a display to scroll in a particular direction based on a determined direction of rotation of the input device 106, or may cause scrolling at a speed based on a determined speed of rotation of the input device 106. FIGS. 22A-24B, discussed below, provide examples of how a rotatable input device 106, such as a crown, may be used to interact with an electronic device and manipulate or change graphics on an associated display.

As another example, rotating the input device 106 may cause different graphics, icons, information, or the like to be shown on the display so that a user may select or otherwise interact with such graphics/icons/information (collectively, a "graphic"). The user may interact with a graphic by touching or applying force to a portion of the display 104 depicting the graphic, through rotational input to the input device 106, through translational input to the input device 106 (e.g., pressing a crown toward the housing of the electronic device), and so on.

The processor 202 may also or alternatively adjust a volume of an audio output of the electronic device 100 in response to detecting rotation of the input device 106. The volume may be adjusted up or down based on a direction of rotation of the input device 106. The processor 202 may also or alternatively adjust other settings of the electronic device 100 (or settings of applications hosted on or accessed by the electronic device 100) in response to detecting rotation of the input device 106 (e.g., the processor 202 may adjust the time displayed by a clock function of the electronic device 100). In some examples, the processor 202 may control movement of a character or item within a game based on a detected rotation (change in angular position), direction of rotation, or speed of rotation of the input device 106.

In some examples, the function of the electronic device 100 controlled by the processor 202 may be determined based on a context of the electronic device 100 or processor 202. For example, the processor 202 may adjust a volume of an audio output of the electronic device 100 when the input device 106 is rotated while an audio player is open or active on the electronic device 100, or the processor 202 may scroll through graphics representing applications or functions when the input device 106 is rotated while a home screen is displayed on the electronic device 100.

The memory 204 may store electronic data that may be utilized by the electronic device 100. For example, the memory 204 may store electrical data or content (e.g., audio files, video files, document files, and so on), corresponding to various applications. The memory 204 may be, for example, non-volatile storage, a magnetic storage medium, optical storage medium, magneto-optical storage medium, read only memory, random access memory, erasable programmable memory, or flash memory.

The input/output interface 206 may receive data from a user or one or more other electronic devices. Additionally, the input/output interface 206 may facilitate transmission of data to a user or to other electronic devices. For example, in embodiments where the electronic device 100 is an electronic watch, the input/output interface 206 may be used to receive data from a network, other electronic devices, or may be used to send and transmit electronic signals via a wireless or wired connection (Internet, Wi-Fi, Bluetooth, and Ethernet being a few examples). In some embodiments, the input/output interface 206 may support multiple network or communication mechanisms. For example, the input/ output interface 206 may pair with another device over a Bluetooth network to transfer signals to the other device, while simultaneously receiving data from a Wi-Fi or other network. The input/output interface 206 may receive input signals from the sensors 208 and the processor 202 may control the input/output interface 206 to output control signals for the electronic device 100.

The power source 212 may be substantially any device capable of providing energy to the electronic device 100. For example, the power source 212 may be a battery, a connection cable that may be configured to connect the electronic device 100 to another power source such as a wall outlet, or the like.

The sensors 208 may include substantially any type of sensor. For example, the electronic device 100 may include one or more audio sensors (e.g., microphones), light sensors (e.g., ambient light sensors), gyroscopes, accelerometers, or the like. The sensors 208 may be used to provide data to the processor 202, which may be used to enhance or vary functions of the electronic device 100. In some embodiments, at least one of the sensors 208 may be a rotary encoder associated with the input device 106 of the electronic device 100 (e.g., a rotary encoder used as, or connected to, a crown of an electronic watch). In some embodiments, at least one of the sensors 208 may be a dome switch that may be depressed and activated by user translation of a crown of an electronic watch.

Figure 3:
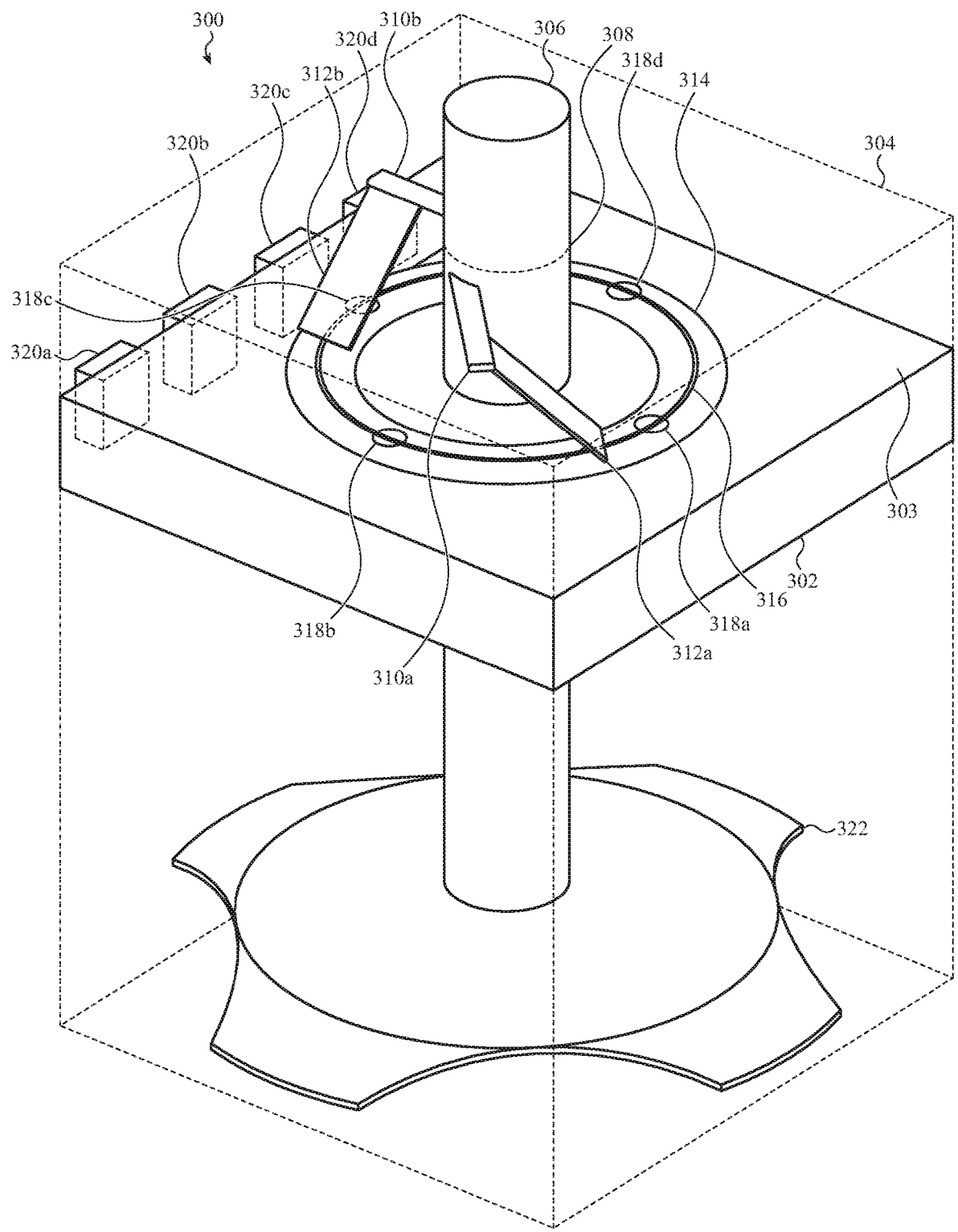
FIG. 3 shows a sample rotary encoder according to one example embodiment.

FIG. 3 illustrates an embodiment of a compact rotary encoder 300 for use in an electronic device, such as electronic device 100. In some embodiments, the rotary encoder 300 may function as the input device 106 of the electronic device 100 such that a shaft 306 of the rotary encoder 300 rotates when the input device 106 rotates. As one example, the input device (and thus the shaft and wipers) may rotate about a long axis of the shaft 306. Such rotation changes the shaft's angular position. As discussed above, in some embodiments, the input device 106 may be the rotating crown of an electronic watch. Similarly, any user-rotatable element may be used in place of a shaft. As previously mentioned, the rotary encoder 300, and other rotary encoders discussed herein, may be a crown of an electronic watch, or part of a crown of an electronic watch. Accordingly, discussions herein of rotary encoders should be understood to include crowns (or bezels, or other rotatable elements) of an electronic device, such as a watch, phone, tablet computing device, input mechanism, and so on.

The rotary encoder 300 may include a base 302, cover 304, and a contact surface 303 on the base 302. The cover 304 may include an aperture 308 through which a rotating shaft 306 passes, extending into an interior of the rotary encoder 300 (or associated device). It should be appreciated that the rotary encoder 300 may take the form of a crown, button, scroll wheel, or the like for an electronic device, and the cover 304 may be a housing of the electronic device. A user may manipulate a portion of the rotary encoder to cause the shaft 306 to rotate about an axis extending along a length of the shaft, in order to provide an input to the electronic device.

In some examples, the shaft 306 may be translatable and slide within the aperture 308, such that a terminal end or portion of the shaft is configured to depress or otherwise activate a dome switch 322 within the base 302. Although a dome switch is illustrated, other types of switches may be employed and actuated by translation of the shaft. At least two arms 310a, 310b may extend outwardly in a radial direction from the shaft 306. As discussed in more detail with respect to FIG. 4, the arms 310a, 310b may be coupled to the shaft 306 and separated by a radial angle. It will be appreciated that although two arms 310a, 310b are illustrated, more arms may be coupled to the shaft 306 (or other rotatable element) and separated by other angles. This may improve the resolution or accuracy of the angular position of the shaft detected by the rotary encoder 300.

Each arm 310a, 310b may include a contact member (e.g., a wiper or slider 312a, 312b, respectively). The wipers 312a, 312b may extend from the arms 310a, 310b at an angle such that the wipers 312a, 312b extend toward, and touch, the contact surface 303 of the base 302. Each wiper 312a, 312b may have a known resistance and may electrically couple the arms 310a, 310b to the contact surface 303 of the rotary encoder 300. Each wiper 312a, 312b contacts the contact surface 303 at a unique wiper contact point. In some examples, the arms 310a, 310b may be provided by one or more rotors, or the arms 310a, 310b may be replaced by a portion (or portions) of the shaft 306 that extends outward from the axis of the rotary encoder 300, and the contact members may be formed on or attached to a surface of the shaft 306 that faces the contact surface 303. It should be appreciated that the contact members/wipers need not be attached to an arm in any embodiment described herein, but instead may be attached to the shaft or to another structure that ultimately is affixed to the shaft.

The contact surface 303 of the base 302 may have a resistance member 314, such as a resistance pad, track, path, or the like provided thereon. In some embodiments, the resistance member 314 may be embedded into or integral with the contact surface 303, while in other embodiments the resistance member 314 may be adjacent, or deposited or otherwise formed on the contact surface 303. As shown in FIG. 3, the resistance member 314 may be disposed in a ring, circle, or other radial pattern around the rotation axis of the shaft 306. The resistance member 314 may have a uniform resistivity along its path, circumference, length, or other dimension. The electrical resistance of the resistance member 314 may be determined by dimensions of the member, such as its thickness, length, width, density, or other dimension. In some examples, the resistance member 314 may have constant concentrations of material such as gold, copper, silver, or other metals (including alloys), resistive polymers, ceramics, other suitable material, or a combination thereof to maintain a uniform resistivity. As will be discussed below, the uniform resistivity may be used to determine a position of a wiper 312a, 312b around the resistance member 314. A constant current source (such as a current regulation circuit) may supply current to the resistance member 314 in certain embodiments. The current source may provide a relatively fixed or invariant current, and thus may be considered a constant current source.

The contact surface 303 of the rotary encoder 300 may also include a conductive element 316 and a group of ground taps 318a-d. The conductive element 316 may be in constant electrical contact with the wipers 312a, 312b as they travel along the resistance member 314. In some embodiments, the conductive element 316 may be embedded or integral with the resistance member 314, while in other embodiments the conductive element 316 may be positioned above or below the resistance member 314.

The conductive element 316 facilitates the detection of an electrical signal provided to the wipers 312a, 312b, as discussed further below with respect to FIGS. 4 and 5. The wipers 312a, 312b may be shaped and angled to maintain electrical contact with the resistance member 314 and the conductive element 316 throughout rotation of the shaft 306. As illustrated in FIG. 3, the conductive element 316 may be shaped substantially the same as the resistance member 314 (e.g., in the shape of a circle or ring coaxially aligned with the axis of rotation of the shaft 306). As the shaft rotates, the angular positions of the shaft and the wipers change, and thus the wipers travel along the resistance member.

As illustrated in FIG. 3, the four ground taps 318a-d may be provided at equally spaced locations around the resistance member 314. However, the number of ground taps 318 may vary based on the number of wipers 312, the angle between wipers 312, a desired accuracy of the rotary encoder 300, the number of bits of an analog-to-digital converter (as discussed below), and the like. In some embodiments, the ground taps may be unequally spaced apart from one another.

The rotary encoder 300 may also include a group of electrical contacts 320a-d. The group of electrical contacts 320a-d may be included in the base 302 or top 304 and may be electrically coupled to the wipers 312, ground taps 318, conductive element 316, and resistance member 314. Electrical contacts 320a-d may provide input and output control of elements of the rotary encoder 300. In some embodiments at least one of the electrical contacts 320a-d may provide an output signal from wiper 312a, an output signal from wiper 312b, a control signal, a common ground, and the like.

Figure 4:
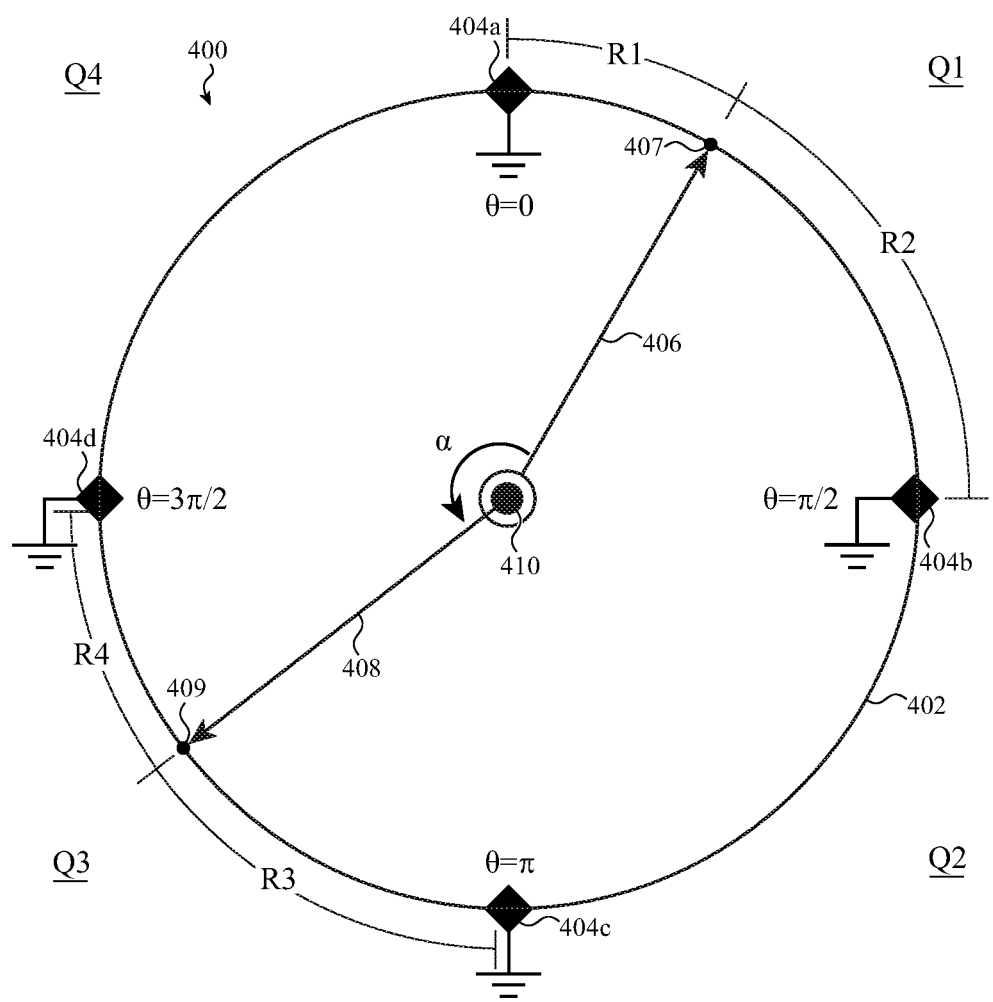
FIG. 4 shows a simplified electrical diagram of the rotary encoder of FIG. 3.

With reference to FIG. 4, a simplified electrical diagram 400 illustrates the electrical connectivity of the rotary encoder 300. As shown in FIG. 4, a resistance member 402 is positioned coaxially around a shaft 410. A group of ground taps 404a-d, which may correspond to the ground taps 318a-d, may be provided around the resistance member 402. The total resistance of the resistance member 402 may be R and the resistance member 402 may have uniform resistivity as discussed above (e.g., uniform resistance per unit of material forming the resistance member 402). That is, when the resistance member 402 has a uniform resistivity, the total or cumulative resistance may be defined as R in the segment from $\Theta=0$ to $\Theta=2\pi$. Accordingly, each quadrant Q1-Q4 may have a predefined resistance $R_{Q1}$-$R_{Q4}$, where $R_{Q1}+R_{Q2}+R_{Q3}+R_{Q4}=R$.

As the wiper travels along (e.g., rotates around) and maintains contact with the resistance member 402 in various locations, the wiper contact points 407, 409 form a voltage dividing circuit as discussed below. However, although a resistance member 402 having uniform resistivity has been discussed, it should be noted that the resistance member 402 may vary its resistance in a known or predetermined manner as a function of angular displacement around the shaft axis.

Although four ground taps 404 are illustrated in FIG. 4, it should be appreciated that more or fewer ground taps may be provided. The resolution of the rotary encoder 300 may vary based on the number n of ground taps provided. As shown in FIG. 4, the first wiper 406 (e.g., a first contact member) and second wiper 408 (e.g., a second contact member) may be separated by an angle α. This angle α may ensure that the first and second wipers 406, 408 output signals in quadrature. Output signals that are in quadrature are ones whose phases are offset by a preset amount or predetermined offset. In some embodiments, the angle α may depend on the number of ground taps. In a particular embodiment, the angle α may be determined by the formula $\alpha=\pi(\frac{1}{2}n)$, where n is the number of ground taps 404.

As illustrated in the example of FIG. 4, a first wiper 406 may contact the resistance member 402 at a contact point 407 between $\Theta=0$ and $\Theta=\pi/2$ (e.g., quadrant Q1) around the resistance member 402. Put another way, the contact point 407 may define a first portion and a second portion of the resistance member 402. Accordingly, when a signal is applied such as a voltage VDD to the first wiper 406, a signal may be measured at the contact point; this measured voltage varies between VDD and zero volts (e.g., ground). In some embodiments, the voltage at the wiper contact point may be measured by including a conductive trace on the wiper itself (not shown). In other embodiments, the signal transmitted through the wiper(s) may be read out using a conductive element 316 on or embedded in the contact surface 303 of the base 302 of the rotary encoder 300 (see FIG. 3). The foregoing generally applies no matter which quadrant or at what contact point the wiper contacts the resistance member.

Generally, the voltage at the wiper contact point 407 is a function of the position of the first wiper 406 as measured along the resistance member 402. The wiper's contact point 407 is between two ground taps, unless it is at a ground tap. For example and as shown in FIG. 4, the contact point 407 is in quadrant Q1 of the resistance member 402, defined as the segment of the resistance member between a first ground tap 404a and a second ground tap 404b. The quadrant Q1 may be thought of as two separate portions or resistors; namely one resistor R1 extending from the first ground tap 404a to the wiper contact point 407, and a second resistor R2 extending from the first ground tap 404a to the wiper contact point. Each portion R1, R2 will have its own voltage, which will vary with the length of the portion (e.g., the distance from the contact point to an adjacent ground tap).

The second wiper 408 may contact the resistance member 402 at a contact point 407 between the ground tap 404b and 404c. A third resistance R3 may be formed between the contact point of the second wiper 408 and the ground tap 404b. A fourth resistance R4 may be formed between the contact point of the second wiper 408 and the ground tap 404c. As will be discussed below with respect to FIGS. 5A-5B, a circuit may be formed enabling readout of the electrical signal at the contact points of the respective wipers 406, 408.

Similarly, the voltage at the wiper contact point 409 is a function of the position of the wiper 408 as taken along the resistance member 402. The wiper's contact point 409 is between two ground taps, unless it is at a ground tap. For example and as shown in FIG. 4, the contact point 409 is in quadrant Q3 of the resistance member 402, defined as the portion of the resistance member 402 between a third ground tap 404c and a fourth ground tap 404d. The quadrant Q3 may be thought of as two separate portions or resistors; namely one resistor R3 extending from the third ground tap 404c to the wiper contact point 409, and a second resistor R4 extending from the fourth ground tap 404d to the wiper contact point 409.

It should be noted that the foregoing is but one example of contact point locations; the wipers may contact the resistive track at any points in any quadrants (or any segment between two ground taps, if the resistive track is not separated into quadrants). Accordingly, any portion of the resistive track between two ground points (e.g., any segment) may be modeled as two resistors that have resistances varying with distance between the contact point and ground tap.

Figure 5A:
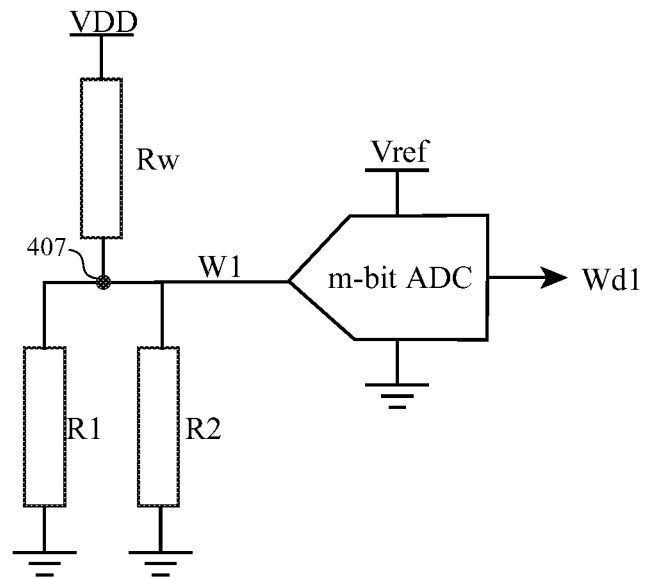
FIGS. 5A-5B show sample circuit diagrams formed by the rotary encoder of FIG. 3.

The circuit shown in FIG. 5A represents the first wiper 406 contacting the resistance member 402. As shown in FIG. 5A, an input signal VDD may be provided to the first wiper; the first wiper has a wiper resistance Rw. In some embodiments, the first wiper may be the first wiper 406 of FIG. 4. At the contact point 407 between the first wiper and the resistance member 402, the input signal VDD is voltage divided by the first resistance R1 and the second resistance R2, as shown in FIG. 5A and similarly in FIG. 4. That is, the voltage at contact point 407 varies with the resistance Rw of the wiper, R1, and R2. As the wiper 406 is rotated to angle θ around the shaft 410 axis (e.g., as the angular position of the shaft changes), the first and second resistances R1, R2 vary.

An input of an m-bit analog-to-digital Converter (ADC) may be electrically coupled to the contact point of the first wiper 406 while its output is electrically connected to a processor 202. The ADC may have a reference voltage Vref determined by the ratio of Rw to R, which is the total resistance of the resistance member 402 as discussed above. In one particular embodiment, the reference voltage Vref may be determined by the formula Vref=(VDD*R)/(R+Rw).

The m-bit ADC may output a digitized signal Wd1 of the voltage measured at the contact point of the first wiper 406 and the resistance member 402. The signal at the wiper contact point 407 may be detected and monitored over time by a processor 202, in order to determine a rotation position of the first wiper 406 and thus an angular position of the shaft, as discussed below with reference to FIG. 6.

Figure 5B:
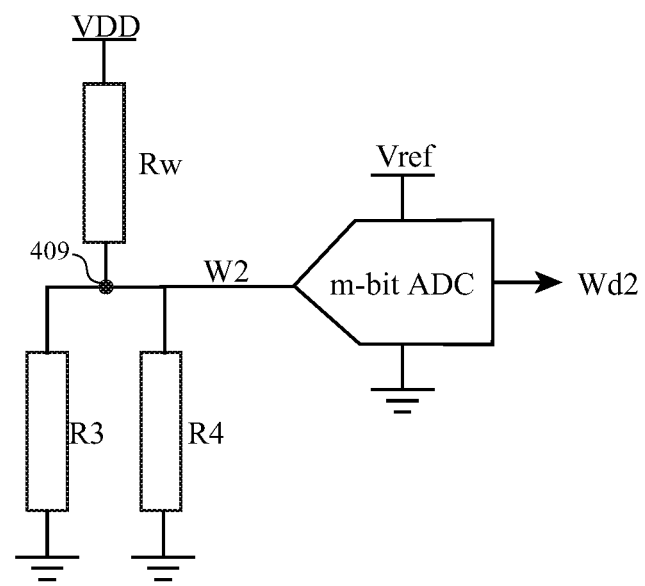

Similar to FIG. 5A, above, FIG. 5B is an example circuit which represents when the second wiper 408 contacting the resistance member 402 at contact point 409 (see also FIG. 4). As shown in FIG. 5B, an input signal VDD may be provided to a second wiper having a wiper resistance Rw. In some embodiments, the second wiper may be the second wiper 408 as shown in FIG. 4.

At the contact point between the second wiper 408 and the resistance member 402, the input signal VDD is voltage divided by the third resistance R3 and the fourth resistance R4, as shown in FIG. 5B and similarly in FIG. 4. That is, the voltage at contact point 409 varies with the resistance Rw of the second wiper, R3, and R4. As the second wiper 408 is rotated at an angle Θ around the shaft 410 axis (e.g., as the angular position of the shaft changes), the third and fourth resistances R3, R4 vary.

An input of an m-bit Analog-to-Digital Converter (ADC) may be electrically coupled to the contact point of the second wiper 408 and may provide a digital output to a processor 202. The ADC may have a reference voltage Vref determined by the ratio of Rw to R (e.g., the total resistance of the resistance member 402). In one particular embodiment, the reference voltage Vref may be determined by the formula Vref=(VDD*R)/(R+Rw). Accordingly, for a given setup with a resistance member 402 having a total resistance R around its length, and given a wiper with a resistance of Rw, the value of Vref may be constant.

With continuing reference to FIG. 5B, the m-bit ADC may output a digitized signal Wd2 of the voltage measured at the contact point of the second wiper 408 and the resistance member 402. The signal at the wiper contact point 409 may be detected and monitored over time by a processor 202, in order to determine a rotation position of the first wiper 406 and thus an angular position of the shaft.

Figure 6A:
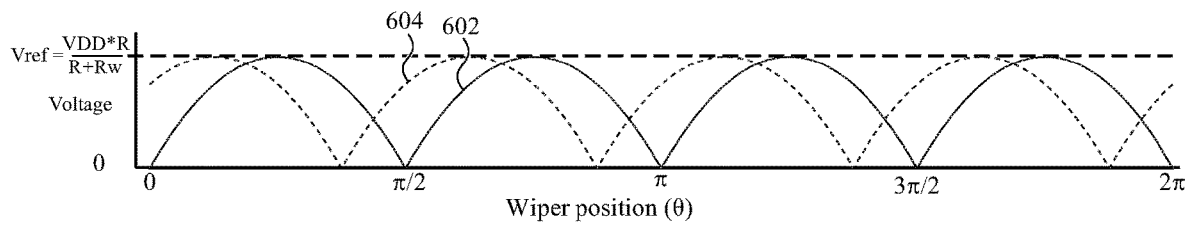
FIGS. 6A-6B show sample voltage vs. position graphs of the rotary encoder of FIG. 3.
Figure 6B:
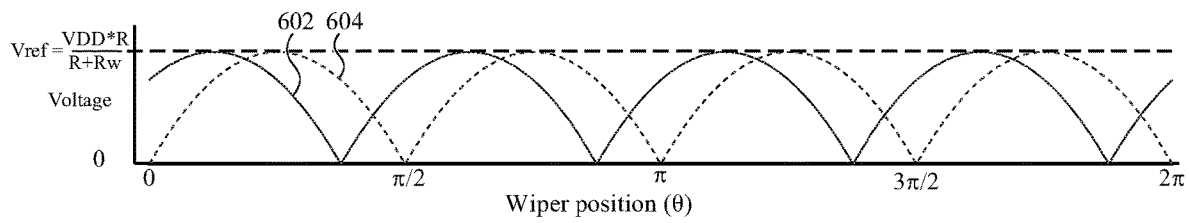

Turning now to FIGS. 6A and 6B, the outputs at wiper contact points 407 and 409 (as discussed above in FIG. 5) are plotted as voltages cycling between zero and a maximum voltage Vref. The figure illustrates the wiper contact voltages as functions of wiper angle Θ, which is the angle between a wiper's current contact point and a zero-angle point on the resistance member (e.g., where Θ=0). Plot 602 may be a plot of the signal at the wiper contact point 407 of the first wiper 406, and line 604 may be a plot of the signal at the wiper contact point 409 of the second wiper 408. As shown in FIG. 6A, as the shaft 410 is rotated (e.g., its angular position changes) causing rotation of the first and second wipers 406, 408, the wiper contact point signals vary between zero and Vref. The plots 602 and 604 are out of phase by a constant, predetermined offset and thus considered to be in quadrature. The amount of quadrature or predetermined offset may depend on the angle α between the first and second wipers 406, 408. By determining a phase difference between plots 602 and 604, the rotational direction around the shaft 410 can be determined, as can the shaft's angular position. Such determination may be done by any suitable processor 202.

FIG. 6A depicts plot 602 as leading plot 604 (i.e., positively out of phase). Accordingly, FIG. 6A may be a plot reflecting rotation of the shaft 410 in a first direction (e.g., clockwise in FIG. 4). Similarly, FIG. 6B depicts plot 602 as lagging plot 604 (i.e., negatively out of phase). Thus, FIG. 6B may be a plot reflecting rotation of the shaft 410 in a second direction (e.g., counter-clockwise in FIG. 4).

Based on the above configuration, the resolution of the rotary encoder 300 may be adjusted to meet various design requirements. The resolution of the rotary encoder 300 may be approximately n*(2^m), where n is the number of ground taps 404 and m is the number of bits in the m-bit ADC. Therefore, in order to increase resolution, one may provide more ground taps or a higher-bit ADC. Furthermore, one may choose an ADC and vary the number of ground taps n to increase or decrease resolution. Conversely, one may choose a number of ground taps n and vary the number of bits m of the ADC to increase or decrease resolution. The ADC may be connected electrically to, and provide digital output to, a processor 202, such that the digital output of the ADC may be used by the processor 202 to determine an angular position of the shaft.

Figure 7:
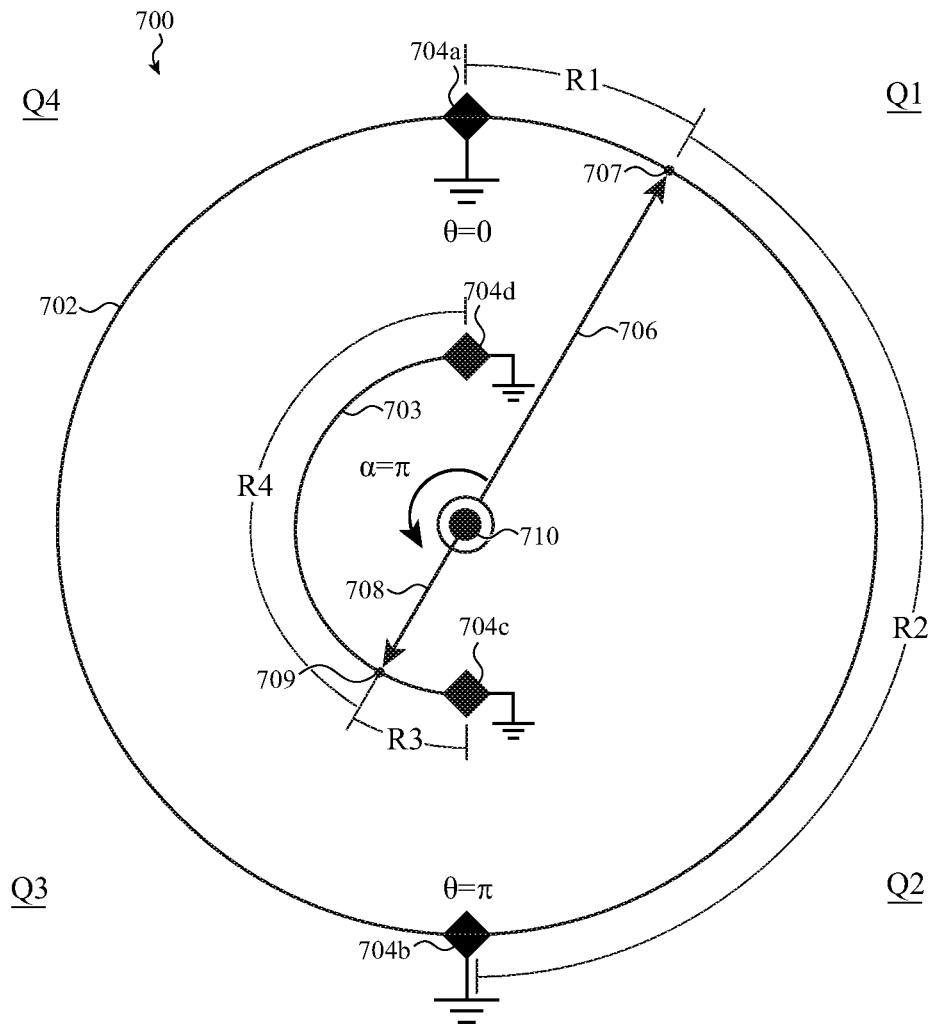
FIG. 7 shows a simplified electrical diagram of a rotary encoder according to another example.

With reference now to FIG. 7, a simplified electrical diagram 700 of another embodiment of a rotary encoder 300 is shown, as is also suitable for use in, or as, a crown of an electronic device. FIG. 7 illustrates the electrical connectivity of a rotary encoder similar to the rotary encoder 300 in FIG. 3 but with a single arm (e.g., a rotor) having a first and second contact member 706, 708 provided thereon. The first contact member 706 may be offset by an angle α from the second contact member 708. Here, α=π.

A resistive track 702 may be positioned coaxially around a shaft 710 (or other user-rotatable element). The first contact member 706 may contact the resistive track 702 at a first contact point 707. A group of electrical sinks 704a, 704b (which act as the ground taps previously described) may be provided around the resistive track 702. The total resistance of the resistive track 702 may be R, and the resistive track may have uniform resistivity as discussed above (e.g., a uniform resistance per unit volume of material forming the resistive track). A second resistive track 703 may be positioned radially inward from the first resistive track 702 and disposed in a half-circle around the shaft 710. The second contact member 708 may contact the second resistive track 703 at a second contact point 709. The radius of the second resistive track 703, which in this example is a half-circle, may be less than the radius of the circular resistive track 702. Another group of electrical sinks 704c, d may be spaced around the second resistive track 703. In one embodiment, second resistive track 703 may have one electrical sink 704c at one end and another electrical sink 704d at the other end.

As illustrated in FIG. 7, the first contact member 706 may contact the resistive track 702 at a first contact point 707 located somewhere between Θ=0 and Θ=π. Accordingly, when a signal is applied (such as a voltage Vref) to the first contact member 706, an output voltage at the contact point may vary between Vref and zero volts (i.e., ground).

A third resistance R3 may be established between the contact point of the second contact member 708 and the electrical sink 704c. Similarly, a fourth resistance R4 may be established between the contact point of the second contact member 708 and the electrical sink 704d. As was discussed above with respect to FIGS. 5A-5B, a circuit may be formed enabling readout of the electrical signals at the contact points of the respective contact members 706, 708.

Generally, the voltage at the first contact member's 706 contact point 707 is a function of the position of the contact member 706 along the resistive track 702. The contact member's contact point 707 is between two electrical sinks, unless it is at an electrical sink. For example and as shown in FIG. 7, the contact point 707 is in quadrant Q1-Q2 of the resistive track 702, defined as the portion of the resistive track between a first electrical sink 704a and second electrical sink 704b. The quadrant Q1-Q2 may be thought of as two separate resistors, namely one resistor R1 extending from the first electrical sink 704a to the contact point 707, and a second resistor R2 extending from the second electrical sink 704b to the contact point 707.

Likewise, the voltage at the second contact member's 708 contact point 709 is a function of the position of the second contact member 708 along the second resistive track 703. The contact member's contact point 709 is between two ground taps, unless it is at a ground tap. For example and as shown in FIG. 7, the contact point 709 is in quadrant Q2-Q3 of the resistive track 703, defined as the portion of the resistance member between a third electrical sink 704c and a fourth electrical sink 704d. The quadrant Q2-Q3 may be thought of as two separate resistors, namely a third resistor R3 extending from the third electrical sink 704c to the contact point 709, and a fourth resistor R4 extending from the fourth electrical sink 704d to the wiper contact point 709.

Although four electrical sinks 704 are illustrated in FIG. 7, it should be appreciated that more or fewer electrical sinks may be provided. The resolution of the rotary encoder 300 may vary based on the number n of electrical sinks provided. As shown in FIG. 7, the first contact member 706 and the second contact member 708 may be offset from one another by an angle $\alpha = \pi$.

The embodiment of FIG. 7 may have substantially the same circuitry as discussed above with respect to FIG. 5. That is, a voltage divider circuit is set up based on the contact position of the first contact member 706 on the first resistive track 702 and a second voltage divider circuit is formed based on the contact position of the second contact member 708 on the second resistive track 703. As the first contact member 706 is rotated around the shaft 710 axis, the first and second resistances R1, R2 vary. An input of an m-bit Analog-to-Digital Converter (ADC) may be electrically coupled to the contact point of the first contact member 706. The m-bit ADC may output a digitized signal Wd1 that is the voltage measured at the contact point between the first contact member 706 and the first resistive track 702. The signal at this contact point 707 may be detected and monitored over time in order to determine a rotational position of the first contact member 706 and thus an angular position of the shaft, as discussed below with reference to FIG. 8.

Similarly, as the second contact member 708 is rotated around the shaft 710 axis, the third and fourth resistances R3, R4 vary. An input of an m-bit Analog-to-Digital Converter (ADC) may be electrically coupled to the contact point of the second contact member 708. The m-bit ADC may output a digitized signal Wd2 of the voltage measured at this contact point between the second contact member 708 and the second resistive track 703. The digital signal Wd2 may be detected and monitored over time in order to determine a rotational position of the second contact member 708 and thus an angular position of the shaft, as discussed below with reference to FIGS. 8A-8B.

Figure 8A:
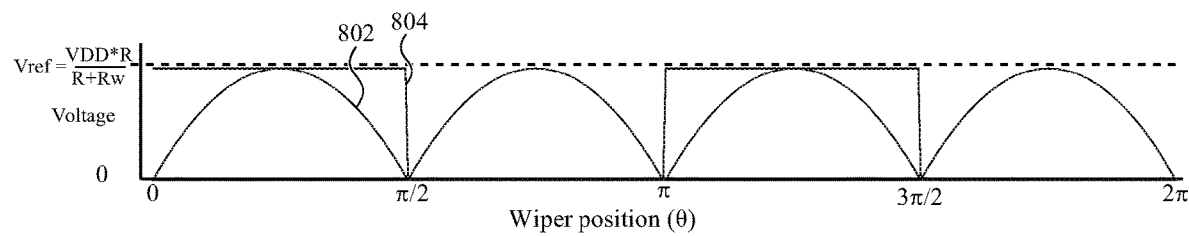
FIGS. 8A-8B show sample voltage vs. position graphs of the rotary encoder of FIG. 7.
Figure 8B:
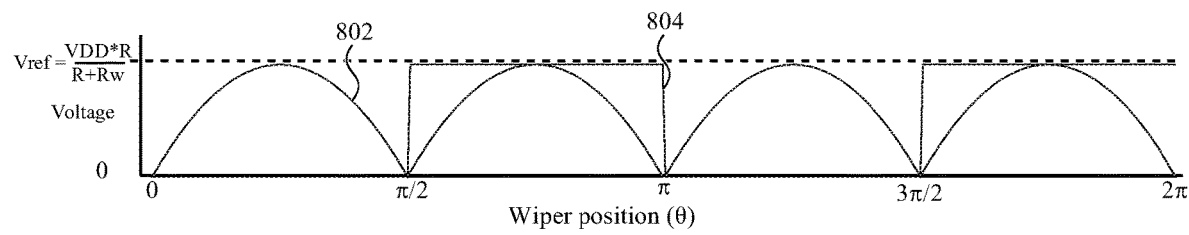

Turning now to FIGS. 8A-8B, the outputs at the contact points 707 and 709 are plotted as voltages cycling between zero and Vref as a function of contact member position around the axis of the shaft (e.g., the contact points and the angle θ vary as the shaft revolves and a contact member travels along its resistive track). Plot 802 is a plot of the voltage of the first contact member 706 as measured at its contact point 707, and plot 804 is a plot of the voltage of the second contact member 708 as measured at its contact point 709.

With respect to FIG. 8A, rotating the shaft 710 (or other user-rotatable element) causes rotation of the first and second contact members 706, 708 and changes the shaft's angular position. As the contact members rotate around the shaft (e.g., the angle Θ changes), their output signals vary between zero and Vref. The output of the first contact member is shown as plot 802 and the output of the second contact member is shown as plot 804.

Due to the layout of the resistive tracks 702, 703 around the shaft 710, plots 802 and 804 may peak at Vref at different angles of rotation Θ. This information may be used to determine the rotational direction of the contact members 706, 708 around the shaft 710. For example, FIG. 8A may depict a rotation of the shaft 410 in a first direction (e.g., clockwise in FIG. 7). Similarly, FIG. 8B may depict a rotation of the shaft 710 in a second direction (e.g., counterclockwise in FIG. 7).

Figure 9A:
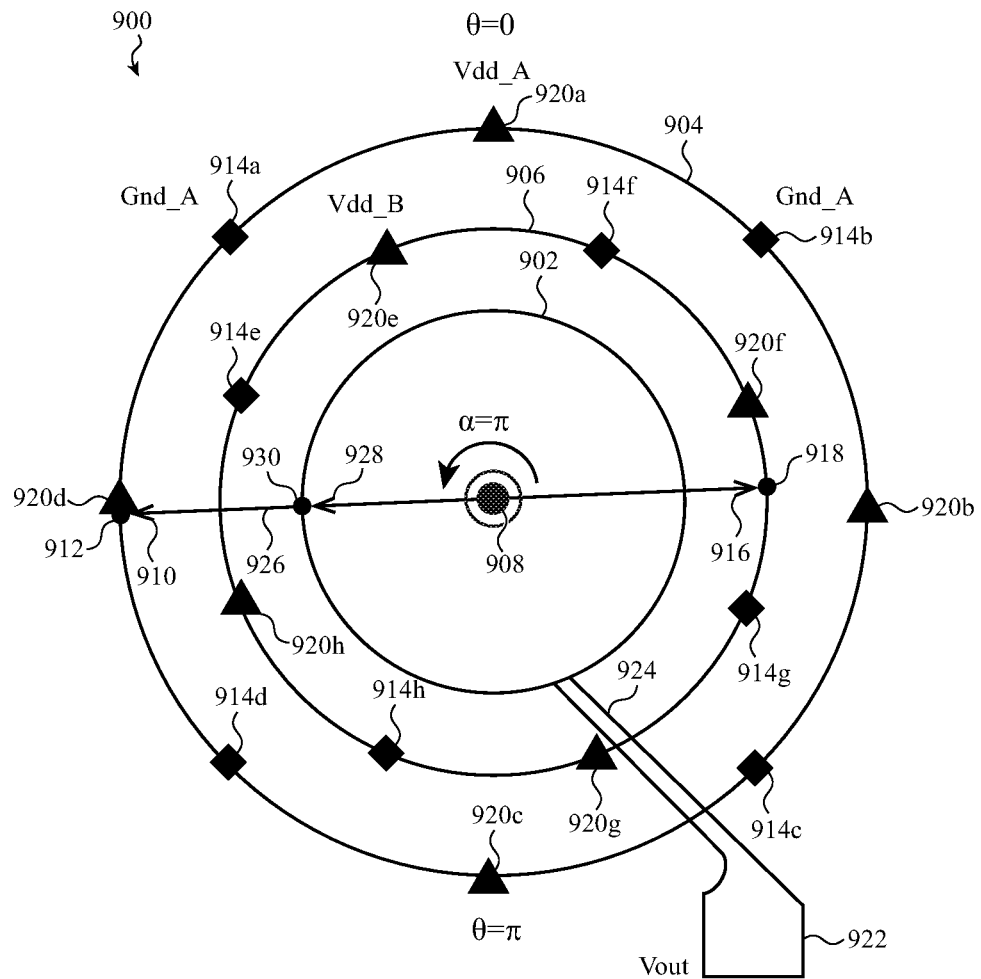
FIGS. 9A-9B show a simplified electrical diagram of a rotary encoder according to another example.
Figure 9B:
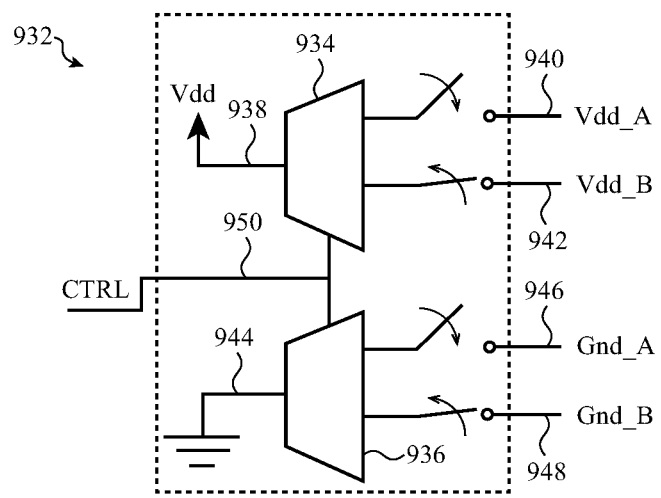

With reference now to FIGS. 9A-9B, a simplified electrical diagram 900 of another embodiment of a rotary encoder is shown. As with the other rotary encoders discussed herein, the embodiment shown in FIGS. 9A-9B may be used as, or in, a crown of an electronic device (such as an electronic watch). FIG. 9A illustrates the electrical connectivity of a rotary encoder similar to the rotary encoder in FIG. 7 but with a conductive output track 902 and a somewhat different arrangement of resistive tracks 904, 906. The resistive tracks 904, 906 and conductive output track 902 may be circular, concentric, and positioned coaxially around a shaft 908. The resistive tracks 904, 906 and conductive output track 902 may be supported by a contact surface of a base of the rotary encoder.

The first resistive track 904 (e.g., a resistance member) may be positioned coaxially around the shaft 908 (or other rotatable element). A first contact member 910 (e.g., a first wiper) may contact the first resistive track 904 at a first contact point 912 and travel along the first resistive track 904 as the shaft 908 rotates with respect to an axis of the rotary encoder. A first array of electrical sinks 914a, 914b, 914c, 914d (which act as the ground taps previously described) may be provided around the first resistive track 904. The total resistance of the first resistive track 904 may be R1, and the first resistive track 904 may have uniform resistivity as discussed above (e.g., a uniform resistance per unit volume of material forming the resistive track). A second resistive track 906 may be positioned radially inward from the first resistive track 904 and disposed around the shaft 908. The total resistance of the second resistive track 906 may be R2, and the second resistive track 906 may have uniform resistivity as discussed above (e.g., a uniform resistance per unit volume of material forming the resistive track). R1 and R2 may be equal or unequal. A second contact member 916 (a second wiper) may contact the second resistive track 906 at a second contact point 918 and travel along the second resistive track 906 as the shaft 908 rotates with respect to the axis of the rotary encoder. The radius of the second resistive track 906 may be less than the radius of the first resistive track 904. A second array of electrical sinks 914e, 914f, 914g, 914h may be spaced around the second resistive track 906. In one embodiment, the electrical sinks 914a-h may be equally spaced about each of the first resistive track 904 and the second resistive track 906. The electrical sinks 914a-h are indicated by diamonds in FIG. 9A, while voltage inputs 920a-h (discussed below) are indicated by triangles. The shape is arbitrary and intended only to provide visual differentiation between the two.

The electrical sinks 914a-h may divide the first resistive track 904 and the second resistive track 906 into multiple segments. An array of voltage inputs may include a first array of voltage inputs 920a, 920b, 920c, 920d connected to the first resistive track 904 and a second array of voltage inputs 920e, 920f, 920g, 920h connected to the second resistive track 906. Each voltage input 920a-h may be positioned between a set of adjacent electrical sinks (e.g., voltage input 920a may be positioned between electrical sinks 914a and 914b, voltage input 920b may be positioned between electrical sinks 914b and 914c, etc.).

The conductive output track 902 may be positioned radially inward from the second resistive track 906 and disposed around the shaft 908. The radius of the conductive output track 902 may be less than the radius of the second resistive track 906. The conductive output track 902 may be electrically connected to a voltage output 922 via a conductor 924 (e.g., a conductive trace, wire, etc.). In alternative embodiments, the concentric relationships of the tracks may differ (e.g., the resistive tracks 904, 906 may be interior to the conductive output track 902).

The first and second contact members 910, 916 may be electrically connected and coupled (affixed) to the shaft 908. In some examples, the first and second contact members 910, 916 may be coupled to a single arm 926 (e.g., a rotor) that is affixed to and rotates with the shaft 908. The entirety of the arm 926 may be conductive, or the arm 926 may include conductive traces or wires that electrically connect the first and second contact members 910, 916. The first contact member 910 may be offset by an angle α (about the shaft 908) from the second contact member 916. Here, α=π. A third contact member 928 (i.e., a third wiper) may be electrically connected to the first and second contact members 910, 916 and coupled to an arm 928 (which arm 928 may be configured similarly to the arm 926, replaced by a portion of the shaft 908 that extends over the resistive tracks 904, 906, etc.). The third contact member 928 may contact the conductive output track 902 at a third contact point 930. The third contact member 928 may travel along, contact, or wipe the conductive output track 902 as the shaft 908 rotates with respect to the conductive output track 902.

During rotation of the shaft 908 with respect to the axis of the rotary encoder, the angles of rotation (Θ) associated with the first contact member 910 and the second contact member 916 change with rotation of the shaft 908, and thus the angles of rotation (or locations) of the first contact point 912 and the second contact point 918 change with respect to an axis of the rotary encoder.

As shown in FIG. 9B, the rotary encoder may further include one or more switches 932 configured to electrically activate the first resistive track 904 while electrically floating the second resistive track 906, and to electrically activate the second resistive track 906 while electrically floating the first resistive track 904. For purposes of this description, a resistive track is electrically active when a current is intentionally induced to flow through the resistive track. As shown, the one or more switches 932 may include a first multiplexer 934 and a second multiplexer 936. The first multiplexer 934 may have an input 938 configured to receive a voltage (e.g., Vdd), a first output 940 to which the voltage may be applied (as Vdd_A) when the first multiplexer 934 is placed in a first state (e.g., a logic "0" state), and a second output 942 to which the voltage may be applied (as Vdd_B) when the first multiplexer 934 is placed in a second state (e.g., a logic "1" state). The first output 940 may be coupled to the first array of voltage inputs 920a-d and the second output 942 may be coupled to the second array of voltage inputs 920e-h. The second multiplexer 936 may have an input 944 configured to be coupled to ground, a first output 946 to which the ground may be connected (as Gnd_A) when the second multiplexer 936 is placed in a first state (e.g., a logic "0" state), and a second output 948 to which the ground may be connected (as Gnd_B) when the second multiplexer 936 is placed in a second state (e.g., a logic "1" state). The first output 946 may be coupled to the first array of electrical sinks 914a-d, and the second output 948 may be coupled to the second array of electrical sinks 914-e-h. In some examples, the control inputs of the first multiplexer 934 and the second multiplexer 936 may be electrically connected at a node 950 to which a common control signal (e.g., a binary control signal, CTRL) may be applied. The common control signal may alternately place each multiplexer 934, 936 in the logic "0" state or the logic "1" state.

When the first resistive track 904 is electrically active, and as rotation of the shaft 908 with respect to the axis of the rotary encoder causes the location of the first contact point 912 to change with respect to the first resistive track 904, the voltage at the first contact point 912 changes (i.e., the voltage is a variable voltage). Similarly, when the second resistive track 906 is electrically active, and as rotation of the shaft 908 with respect to the axis of the rotary encoder causes the location of the second contact point 918 to change with respect to the second resistive track 906, the voltage at the second contact point 918 changes (i.e., the voltage is a variable voltage). Because just one of the resistive tracks 904, 906 is electrically active at a time (while the other resistive track is floating), the voltages at the first contact point 912 and the second contact point 918 may be alternately output on the conductive output track 902. Despite the variance in the voltages at the first contact point 912 and the second contact point 918, the first resistive track 904, second resistive track 904, and/or other components of the rotary encoder may be configured to maintain a predetermined offset between the voltages.

Based on the voltages outputted on the conductive output track 902 (or at output 922), and the predetermined offset between the voltages, a processor may determine an angle of rotation of the first contact member 910, the second contact member 916, or the shaft 908. The processor may also or alternatively determine a direction of rotation or speed of rotation of the shaft 908.

Figure 10:
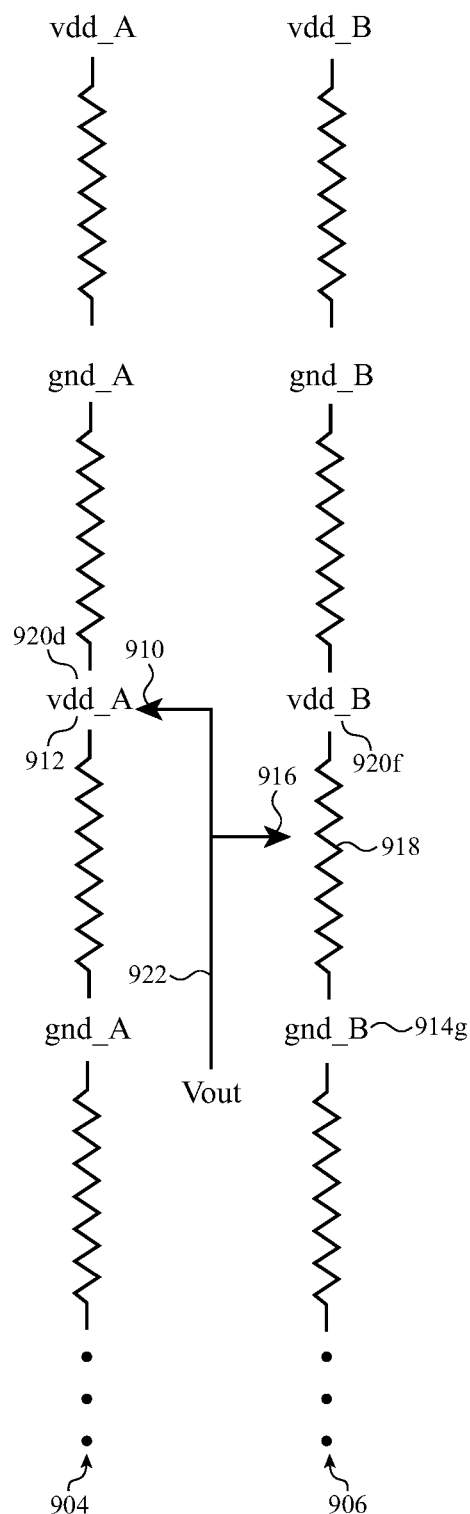
FIG. 10 shows a sample circuit diagram formed by the rotary encoder of FIG. 9.

The circuit shown in FIG. 10 represents the first contact member 910 contacting the first resistive track 904 and the second contact member 916 contacting the second resistive track 906. Each of the first and second resistive tracks is modeled as a set of resistors separated by grounds, in accordance with the diagram of FIG. 9A. As shown in FIG. 10, the first resistive track 904 may be electrically activated by coupling Vdd_A to the first array of voltage inputs 920a-d and coupling Gnd_A to the first array of electrical sinks 914a-d. Alternatively, the second resistive track 906 may be electrically activated by coupling Vdd_B to the second array of voltage inputs 920e-h and coupling Gnd_B to the second array of electrical sinks 914e-h. The voltages at the first and second contact points 912, 918 may be alternately output at the voltage output 922 (as Vout) via the first contact member 910, arm 926, and conductive output track 902 (see FIG. 9A), and via the second contact member 916, arm 926, and conductive output track 902. Each of the first contact member 910, second contact member 916, arm 926, and conductive output track 902 may be associated with an impedance and consequent voltage drop that affects the voltage obtained from the first or second contact point 912, 918.

Figure 11:
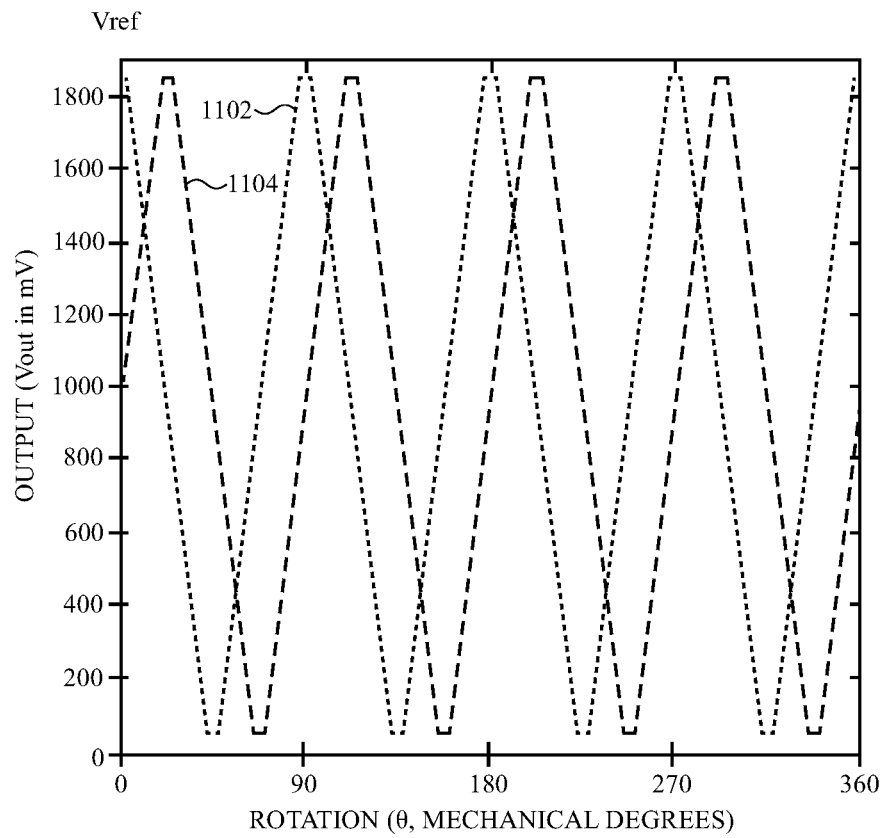
FIG. 11 shows a sample voltage vs. position graph of the rotary encoder of FIG. 9.

Turning now to FIG. 11, an example of the voltages at the first contact point 912 and second contact point 918 (as discussed above in FIGS. 9A, 9B, and 10) are plotted as voltages cycling between zero and a maximum voltage Vref (e.g., Vdd_A or Vdd_B). The figure illustrates the voltages as a function of a rotation angle Θ, which is the angle between a contact point and a zero-angle point of the resistive tracks 904, 906 (e.g., where Θ=0). Plot 1102 may be a plot of the voltage at the first contact point 912, and plot 1104 may be a plot of the voltage at the second contact point 918. As shown in FIG. 11, as the shaft 908 of the rotary encoder shown in FIG. 9A is rotated (e.g., as its angle of rotation or angular position changes), causing rotation of the first and second contact members 910, 916, the voltages vary between zero and Vref. Plots 1102 and 1104 are out of phase by a constant, predetermined offset, and are thus considered to be in quadrature. The amount of quadrature or predetermined offset may depend on the angle α between the first and second contact members 910, 916. By determining a phase difference between plots 1102 and 1104, the direction of rotation of the shaft 908 can be determined, as can the shaft's angular position. Such determinations may be made by any suitable processor 202.

Figure 12:
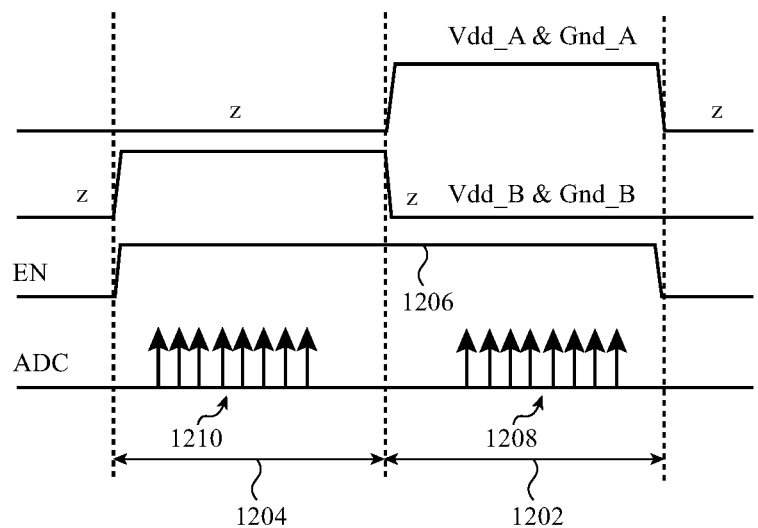
FIG. 12 shows a timing diagram for the rotary encoder of FIG. 9.

FIG. 12 shows an example of a timing diagram for the rotary encoder shown in FIGS. 9A and 9B. As shown, the first resistive track 904 may be electrically activated during a first time period 1202 by connecting the first array of voltage inputs 920a-d to Vdd_A and the first array of electrical sinks 914a-d to Gnd_A. The second resistive track 906 may be electrically isolated (held at a high impedance state, z) during the first time period 1202. Similarly, the second resistive track 906 may be electrically activated during a second time period 1204 by connecting the second array of voltage inputs 920e-h to Vdd_A and the second array of electrical sinks 914e-h to Gnd_A. The first resistive track 904 may be electrically isolated (held at a high impedance state, z) during the second time period 1204. One or more switches, such as the first multiplexer 934 and the second multiplexer 936, may be operated to provide alternating instances of the first time period 1202 and the second time period 1204. In some examples, electrical activation of the first resistive track 904 or the second resistive track 906 may require assertion of an enable (EN) signal 1206. During each of the first time period 1202 and the second time period 1204, an ADC may obtain one or more samples 1208, 1210 of the voltage at the first contact point 912 or the second contact point 918. Obtaining multiple samples during each of the first time period 1202 and the second time period 1204 may improve direction of rotation or speed of rotation determinations.

Figure 13:
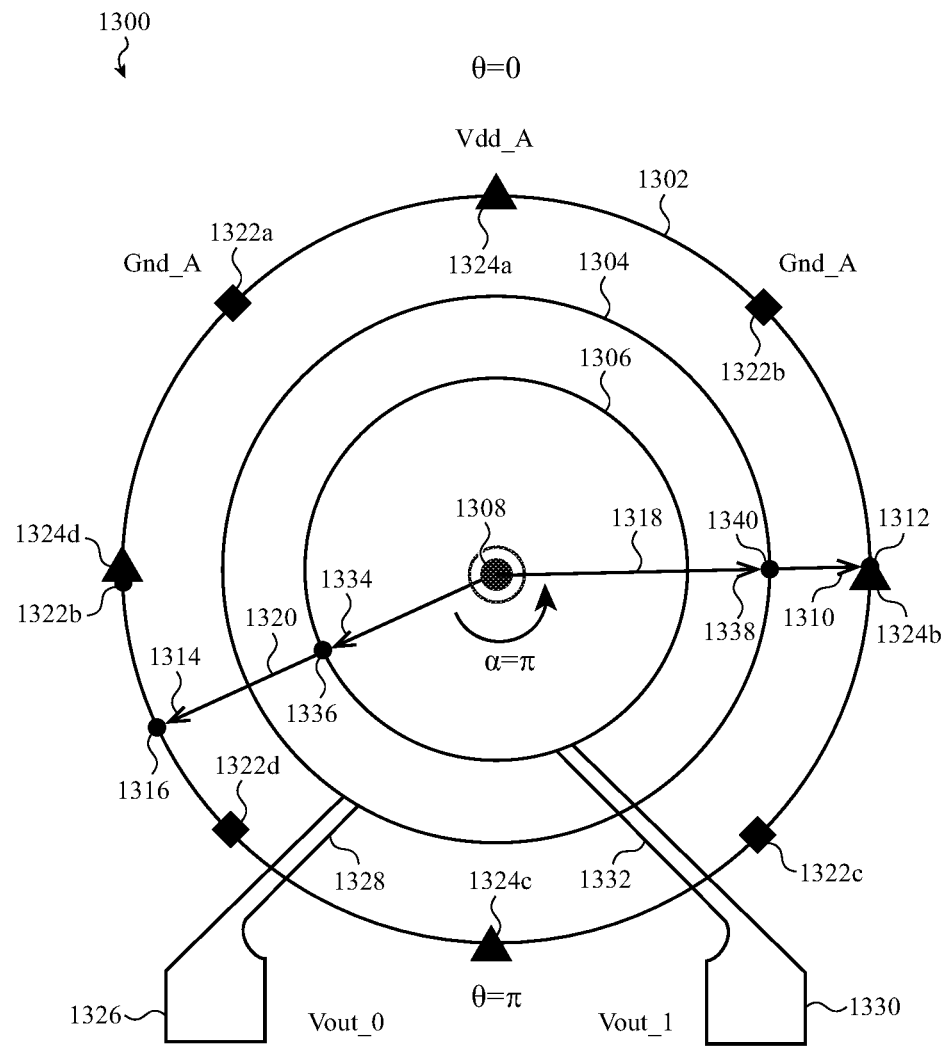
FIG. 13 shows a simplified electrical diagram of a rotary encoder according to another example.

With reference now to FIG. 13, a simplified electrical diagram 1300 of another embodiment of a rotary encoder is shown. FIG. 13 illustrates the electrical connectivity of a rotary encoder similar to the rotary encoder in FIGS. 9A-9B, but with a single resistive track 1302 and multiple conductive output tracks 1304, 1306. The resistive track 1302 and conductive output tracks 1304, 1306 may be circular, concentric, and positioned coaxially around a shaft 1308. The resistive track 1302 and conductive output tracks 1304, 1306 may be supported by a contact surface of a base of the rotary encoder.

The resistive track 1302 (i.e., a resistance member) may be positioned coaxially around the shaft 1308 (or other rotatable element). A first contact member 1310 (i.e., a first wiper) may contact the resistive track 1302 at a first contact point 1312 and travel along the resistive track 1302 as the shaft 1308 rotates with respect to an axis of the rotary encoder. A second contact member 1314 (i.e., a second wiper) may contact the resistive track 1302 at a second contact point 1316 and travel along (e.g., wipe) the resistive track 1302 as the shaft 1308 rotates with respect to the axis of the rotary encoder. The first contact member 1310 may be electrically connected to a first arm 1318 (e.g., a first rotor) that is affixed to and rotates with the shaft 1308. The second contact member 1314 may be electrically connected to a second arm 1320 (e.g., a second rotor) that is affixed to and rotates with the shaft 1308. The first arm 1318 may be electrically isolated from the second arm 1320. The entireties of the first and second arms 1318, 1320 may be conductive, or the first and second arms 1318, 1320 may include conductive traces or wires that electrically connect to the first or second contact member 1310, 1314. In other examples, the first and second contact members 1310, 1314 may be affixed to the shaft 1308 in other ways (e.g., the shaft 1308 may have a portion that extends outward from the axis of the rotary encoder and over the resistive track 1302, and the first and second contact members 1310, 1314 may be formed on or attached to a surface of the shaft 1308 that faces the resistive track 1302). The first contact member 1310 may be offset by an angle α (about the shaft 1308) from the second contact member 1310.

An array of electrical sinks 1322a, 1322b, 1322c, 1322d (which act as the ground taps previously described) may be provided around the resistive track 1302. The total resistance of the resistive track 1302 may be R, and the resistive track 1302 may have uniform resistivity as discussed above (e.g., a uniform resistance per unit volume of material forming the resistive track). In one embodiment, the electrical sinks 1322a-d may be equally spaced about the resistive track 1302. The electrical sinks 1322a-d may divide the resistive track 1302 into multiple segments. An array of voltage inputs 1324a, 1324b, 1324c, 1324d may also be connected to the resistive track 1302. Each voltage input 1324a-d may be positioned between a set of adjacent electrical sinks (e.g., voltage input 1324a may be positioned between electrical sinks 1322a and 1322b, voltage input 1324b may be positioned between electrical sinks 1322b and 1322c, etc.).

A first conductive output track 1304 and a second conductive output track 1306 may be positioned radially inward from the resistive track 1302 and disposed around the shaft 1308. The radius of the first conductive output track 1304 may be less than the radius of the resistive track 1302, and the radius of the second conductive output track 1306 may be less than the radius of the first conductive output track 1304. The first conductive output track 1304 may be electrically connected to a first voltage output 1326 via a first conductor 1328 (e.g., a conductive trace, wire, etc.), and the second conductive output track 1306 may be electrically connected to a second voltage output 1330 via a second conductor 1332. In alternative embodiments, the concentric relationships of the tracks may differ (e.g., the resistive track 1302 may be interior to the conductive output tracks 1304, 1306).

A third contact member 1334 (e.g., a third wiper) may be electrically connected to the first contact member 1310 and coupled to the first arm 1318 (or otherwise affixed to the shaft 1308). The third contact member 1334 may contact the first conductive output track 1304 at a third contact point 1336. The third contact member 1334 may contact, travel along, or otherwise wipe the conductive output track 1304 as the shaft 1308 rotates with respect to the axis of the rotary encoder. A fourth contact member 1338 (e.g., a fourth wiper) may be electrically connected to the second contact member 1314 and coupled to the second arm 1324 (or otherwise affixed to the shaft 1308). The fourth contact member 1338 may contact the second conductive output track 1306 at a fourth contact point 1340. The fourth contact member 1338 may contact or wipe the second conductive output track 1306 as the shaft 1308 rotates with respect to the axis of the rotary encoder.

During rotation of the shaft 1308 with respect to the axis of the rotary encoder, the angles of rotation (Θ) associated with the first contact member 1310 and the second contact member 1314 change with rotation of the shaft 1308, and thus the angles of rotation (or locations) of the first contact point 1312 and the second contact point 1316 change with respect to the axis of the rotary encoder.

As rotation of the shaft 1308 with respect to the axis of the rotary encoder causes the locations of the first and second contact points 1312, 1316 to change with respect to the resistive track 1302, the voltages at the first and second contact points 1312, 1316 change (e.g., the voltages are variable voltages). The voltage at the first contact point 1312 may be output via the first conductive output track 1304, and the voltage at the second contact point 1316 may be output via the second conductive output track 1306. Despite the variance in the voltages at the first contact point 1312 and the second contact point 1316, the resistive track 1302 and/or other components of the rotary encoder may be configured to maintain a predetermined offset between the voltages.

Based on the voltages (Vout0, Vout1) outputted on the first and second conductive output tracks 1304, 1306 (or at outputs 1326 and 1330), and the predetermined offset between the voltages, a processor may determine an angle of rotation of the first contact member 1310, the second contact member 1310, or the shaft 1308. The processor may also or alternatively determine a direction of rotation or speed of rotation of the shaft 1308.

Figure 14:
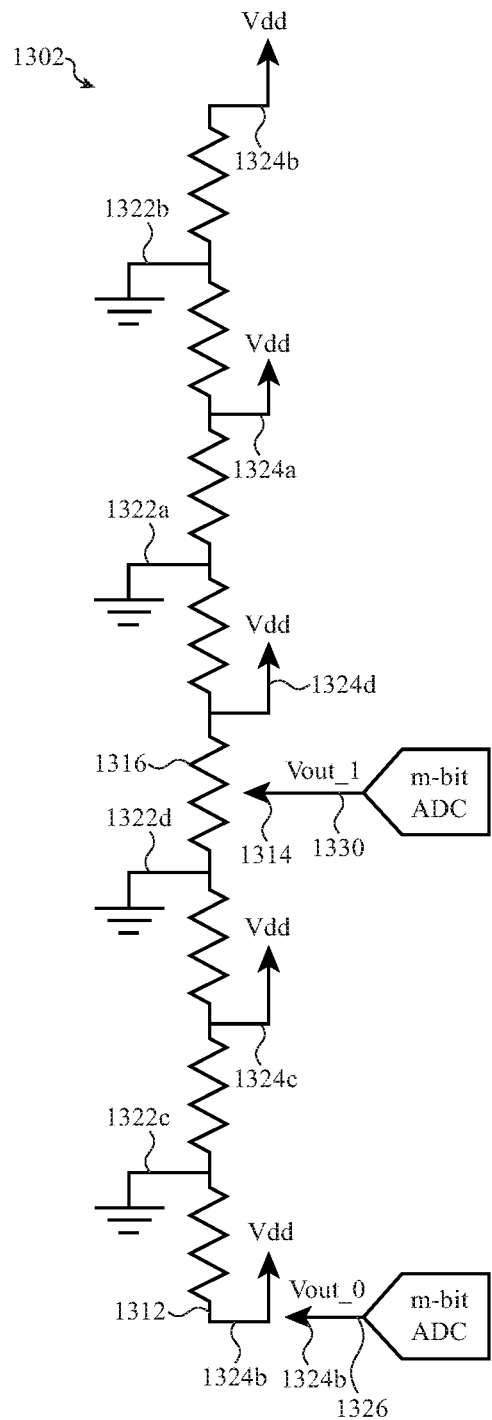
FIG. 14 shows a sample circuit diagram formed by the rotary encoder of FIG. 13.

The circuit shown in FIG. 14 represents the first and second contact members 1310, 1314 contacting the resistive track 1302. As shown in FIG. 14, the resistive track 1302 may be electrically activated by coupling Vdd to the array of voltage inputs 1324a-d and coupling Gnd to the array of electrical sinks 1322a-d. The voltages at the first and second contact points 1312, 1316 may be simultaneously output at the first and second voltage outputs 1326, 1330, as Vout_0 and Vout_1, via the first contact member 1310, first arm 1318, and first conductive output track 1304 (see FIG. 13), and via the second contact member 1314, second arm 1320, and second conductive output track 1306. Each of the first contact member 1310, second contact member 1314, first arm 1318, second arm 1320, first conductive output track 1304, and second conductive output track 1306 may be associated with an impedance and consequent voltage drop that affects the voltage obtained from the first or second contact point 1312, 1316. The voltages at the first contact point 1312 and second contact point 1316 may be plotted as voltages cycling between zero and a maximum voltage Vref (e.g., Vdd), with Vout_0 being plotted as plot 1102 in FIG. 11 and Vout_1 being plotted as plot 1104 in FIG. 11.

Figure 15:
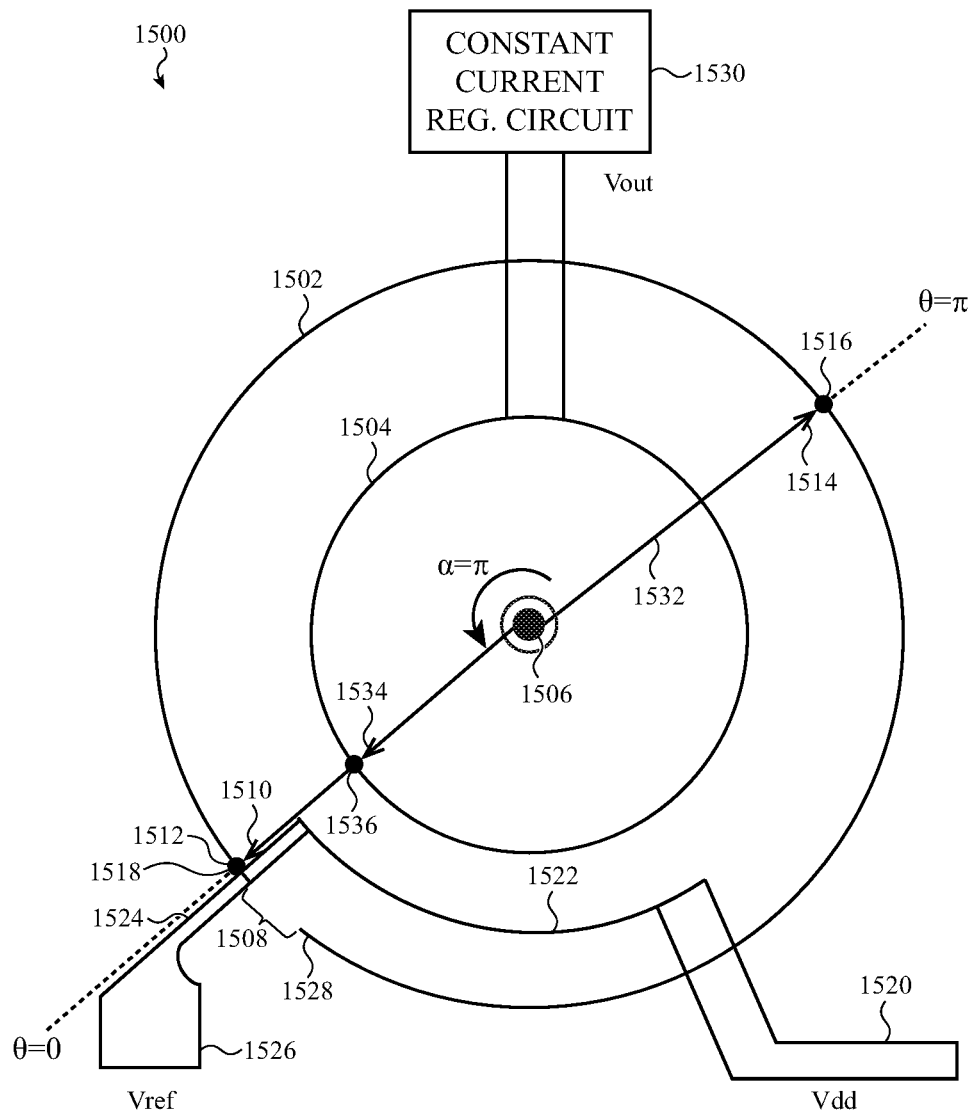
FIG. 15 shows a simplified electrical diagram of a rotary encoder according to another example.

With reference now to FIG. 15, a simplified electrical diagram 1500 of another embodiment of a rotary encoder is shown. This rotary encoder may be used as, or in, a crown of an electronic device, similar to other rotary encoders discussed herein. FIG. 15 illustrates the electrical connectivity of a rotary encoder with a single resistive track 1502 and a single conductive output track 1504. The resistive track 1502 and conductive output track 1504 may be circular, concentric, and/or positioned coaxially around a shaft 1506. The resistive track 1502 and conductive output track 1504 may be supported by a contact surface of a base of the rotary encoder.

The resistive track 1502 (or any other resistance member) may be positioned coaxially around the shaft 1506 (or other rotatable element), but may have a radial gap 1508 in its circumference. A first contact member 1510 (i.e., a first wiper) may contact the resistive track 1502 at a first contact point 1512 and wipe (e.g. travel along) the resistive track 1502 as the shaft 1506 rotates with respect to an axis of the rotary encoder. A second contact member 1514 (a second wiper) may contact the resistive track 1502 at a second contact point 1516 and wipe the resistive track 1502 as the shaft 1506 rotates with respect to the axis of the rotary encoder. The total resistance of the resistive track 1502 may be R, and the resistive track 1502 may have uniform resistivity as discussed above (e.g., a uniform resistance per unit volume of material forming the resistive track).

A first end 1518 of the resistive track 1502 may be electrically connected to a voltage input 1520, which voltage input 1520 may receive a voltage such as Vdd. In some examples, the voltage input 1520 may be coupled to the first end 1518 of the resistive track 1502 via a resistor 1522 (e.g., a resistive trace, a wire, etc.). As shown in FIG. 15, a less resistive conductor 1524, or other more or less resistive elements may also be used to couple the voltage input 1520 to the first end 1518 of the resistive track 1502. A reference voltage output 1526 may also be coupled to the first end 1518 of the resistive track 1502. A second end 1528 of the resistive track 1502 may not be electrically connected to other elements.

The conductive output track 1504 may be positioned radially inward from the resistive track 1502 and disposed around the shaft 1506. The radius of the conductive output track 1504 may be less than the radius of the resistive track 1502. The conductive output track 1504 may be electrically connected to a constant current regulation circuit 1530. In alternative embodiments, the concentric relationship of the tracks may differ (e.g., the resistive track 1502 may be interior to the conductive output track 1504, the two may be positioned such that they are not separated by an equal distance around their circumferences, and so on). The constant current regulation circuit 1530 supplies a constant current to the conductive output track 1504, thereby enabling the voltage Vout to change as the contact member traverses the track, as described below. It should be appreciated that other embodiments described herein may likewise include constant current sources, and that any constant current source may be the illustrated constant current regulation circuit 1530.

The first and second contact members 1510, 1514 may be electrically connected and coupled to a single arm 1532 (e.g., a rotor) that is affixed to and rotates with the shaft 1506. The entirety of the arm 1532 may be conductive, or the arm 1532 may include conductive traces or wires that electrically connect the first and second contact members 1510, 1514. In other examples, the first and second contact members 1510, 1514 may be affixed to the shaft 1506 in other ways (e.g., the shaft 1506 may have a portion that extends outward from the axis of the rotary encoder and over the resistive track 1502, and the first and second contact members 1510, 1514 may be formed on or attached to a surface of the shaft 1506 that faces the resistive track 1502). The first contact member 1510 may be offset by an angle α (about the shaft 1506 from the second contact member 1514. Here, α=π. A third contact member 1534 (i.e., a third wiper) may be electrically connected to the first and second contact members 1510, 1514 and coupled to the arm 1532 (or otherwise affixed to the shaft 1506). The third contact member 1534 may contact the conductive output track 1504 at a third contact point 1536. The third contact member 1534 may contact or wipe the conductive output track 1504 as the shaft 1506 rotates with respect to the axis of the rotary encoder.

During rotation of the shaft 1506 with respect to the axis of the rotary encoder, the angles of rotation (Θ) associated with the first contact member 1510, the second contact member 1514, and the third contact member 1534 change with rotation of the shaft 1506, and thus the angles of rotation (or locations) of the first contact point 1512, the second contact point 1516, and the third contact point 1536 change with respect to the axis of the rotary encoder.

As rotation of the shaft 1506 with respect to the axis of the rotary encoder causes the locations of the first and second contact points 1512, 1516 to change with respect to the resistive track 1502, the voltage at the third contact point 1516 changes (thus, the voltage is a variable voltage). The voltage (Vout) at the third contact point 1516 may be output via the conductive output track 1504.

Based on the voltage (Vout) outputted on the conductive output track 1504, and a reference voltage (Vref) that is outputted at the reference voltage output 1526, a processor may determine an angle of rotation of the first contact member 1510, the second contact member 1514, the third contact member 1534, or the shaft 1506. The processor may also or alternatively determine a direction of rotation or speed of rotation of the shaft 1506.

Figure 16:
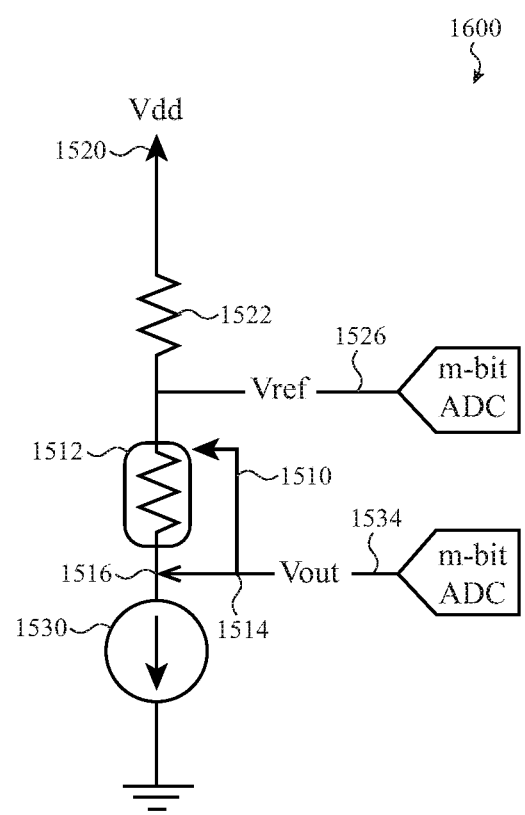
FIG. 16 shows a sample circuit diagram formed by the rotary encoder of FIG. 15.

The circuit 1600 shown in FIG. 16 represents the first and second contact members 1510, 1514 contacting the resistive track 1502. As shown in FIG. 16, the reference voltage output 1526 may be coupled to the voltage input 1520 via the resistor 1522, and the resistive track 1502 may be coupled between the reference voltage output 1526 and the constant current regulation circuit 1530. The voltage (Vout) at the third contact point 1516 may be based on the locations of the first contact point 1512 and the second contact point 1516 with respect to the resistive track 1502. The constant current regulation circuit 1530 ensures that the current provided to the conductive output track 1504 is invariant, and thus that the voltage changes in a known fashion as the contact member traverses (wipes) the conductive output track 1504. It should be appreciated that the constant current regulation circuit is not electrically connected to the resistive track 1502.

Figure 17:
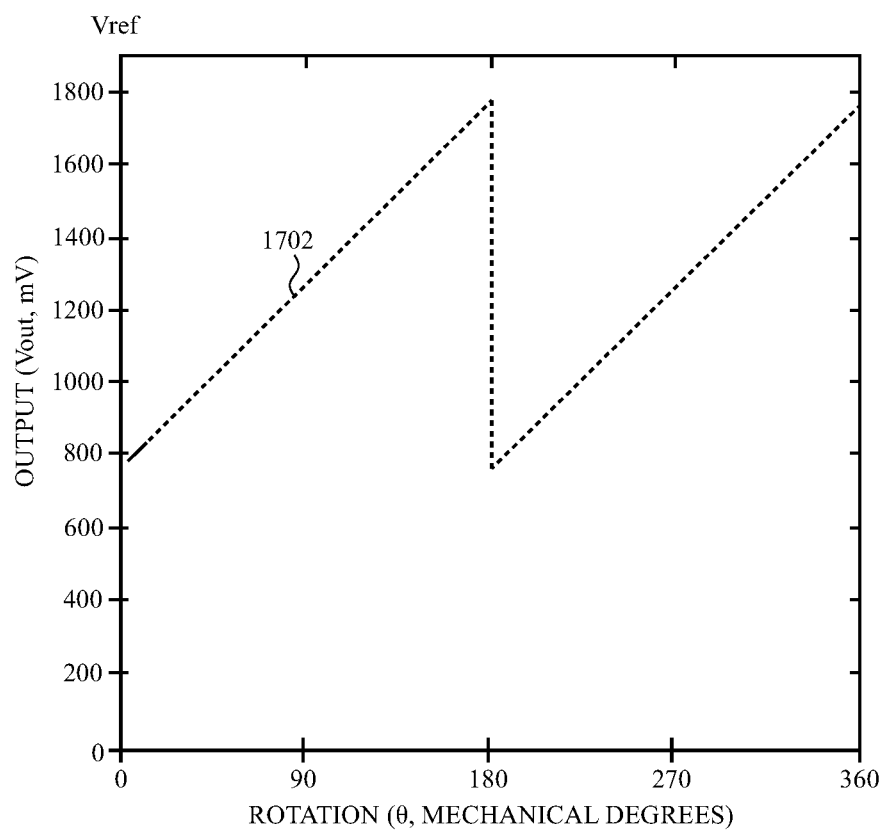
FIG. 17 shows a sample voltage vs. position graph of the rotary encoder of FIG. 15.

FIG. 17 illustrates an example plot 1702 of the difference between the voltage (Vout) that is output via the conductive output track 1504 and the reference voltage (Vref) that is output via the reference voltage output 1526 (as discussed above in FIG. 15). The voltage difference cycles between zero and a maximum voltage Vref. The figure illustrates the voltages as a function of a rotation angle Θ, which is the angle between a contact point and a zero-angle point of the resistive track 1502 (e.g., where Θ=0). As shown in FIG. 17, as the shaft 1506 is rotated (e.g., as its angle of rotation or angular position changes), causing rotation of the first, second, and third contact members 1510, 1514, 1534, the voltage difference varies between zero and Vref in a sawtooth pattern. The slope direction of the sawtooth pattern is indicative of the direction of rotation of the shaft 1506.

Figure 18:
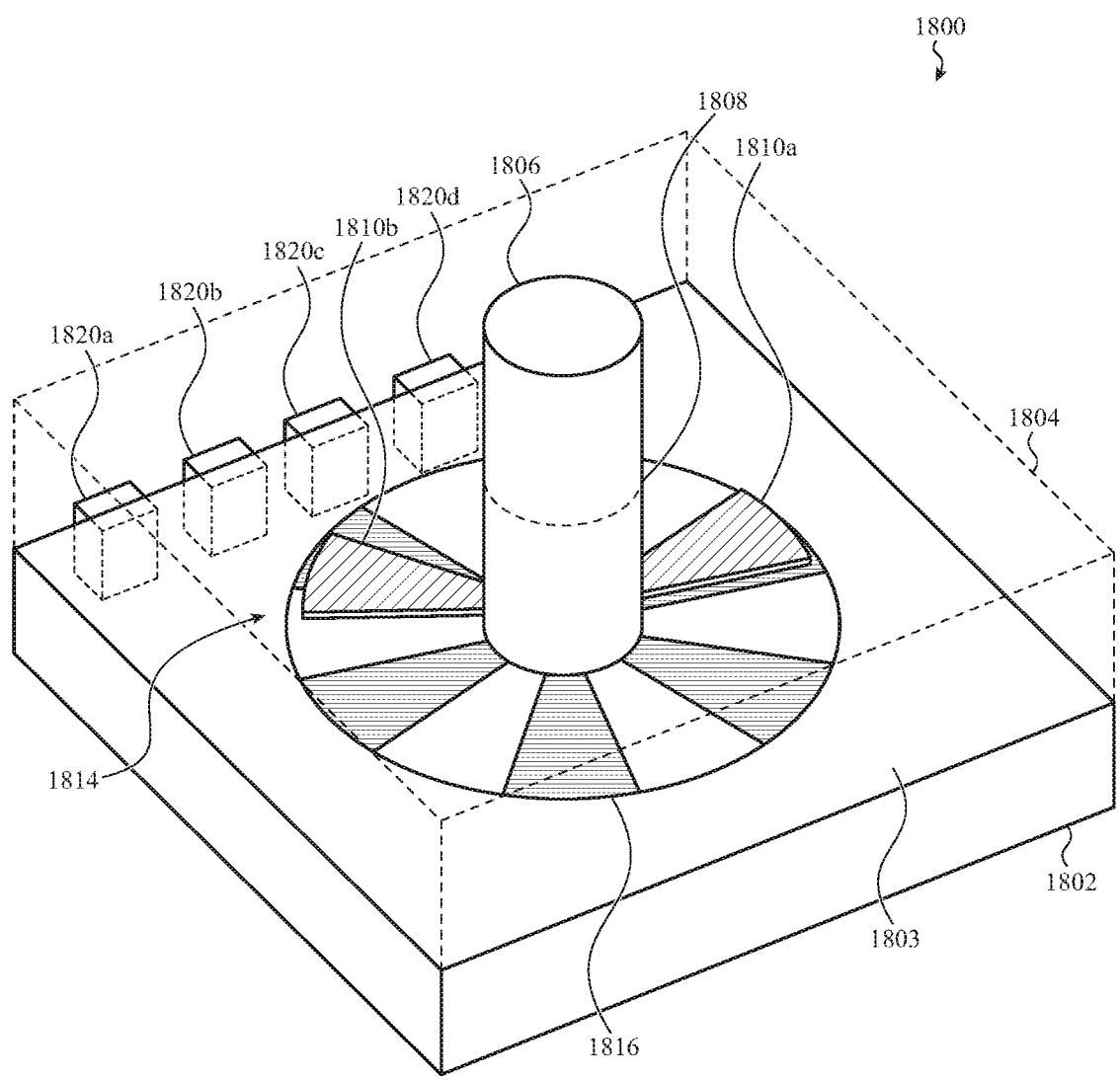
FIG. 18 shows another example of a rotary encoder.

With reference now to FIG. 18, another embodiment of a compact rotary encoder 1800 is illustrated for use as a crown in an electronic device, such as electronic device 100. In some embodiments the rotary encoder 1800 may be coupled to the input device 106 of the electronic device 100 such that a shaft 1806, or other rotatable element, of the rotary encoder 1800 rotates when the input device 106 rotates. As discussed above, in some embodiments the input device 106 may be the rotating crown of an electronic watch. The rotary encoder 1800 may include a base 1802, cover 1804, and a contact surface 1803 of the base 1802. The cover 1804 may include an aperture 1808 through which a rotating shaft 1806 passes, such that the shaft is at least partially received within the housing. In some embodiments, the cover 1804 may be a housing of an electronic device in which the rotary encoder is at least partially enclosed. For example, a knob, portion of the shaft, or other user-manipulable element may protrude from an electronic device housing. A user may turn the user-manipulable element, thereby causing the shaft 1806 to rotate about an axis extending along a length of the shaft. A user may rotate a crown of an electronic watch in this fashion, as one example.

At least two capacitive members 1810a, 1810b may extend outwardly in a radial direction from the shaft 1806. The capacitive members 1810a, 1810b may be coupled to the shaft 1806 and separated by an angle α around the shaft 1806. It should be noted that although two capacitive members 1810a, 1810b are illustrated, more capacitive members 1810 may be coupled to the shaft 1806 and separated by other angles α.

Each capacitive member 1810a, 1810b may have a known capacitance. The contact surface 1803 of the base 1802 may have a capacitance sensing region 1814. The capacitance sensing region 1814 may include or define capacitance sensors 1816. In some embodiments the capacitance sensing region 1814 may be embedded or integral with the contact surface 1803. As shown in FIG. 18, the capacitance sensing region 1814 may be disposed coaxially beneath the rotating shaft 1806 such that capacitive members 1810a, 1810b rotate with respect to each other while maintaining a predetermined separation distance. That is, the capacitive members 1810a, 1810b rotate angularly with the shaft 1806 and interact with the capacitance sensors 1816 in the capacitance sensing region 1814 at different points throughout a full rotation.

The rotary encoder 1800 may also include a group of electrical contacts 1820a-d. The group of electrical contacts 1820a-d may be included in the base 1802 and may be electrically coupled to the capacitive members 1810a, b and capacitance sensors 1816. Electrical contacts 1820a-d may provide input and output control of elements of the rotary encoder 1800.

Figure 19:
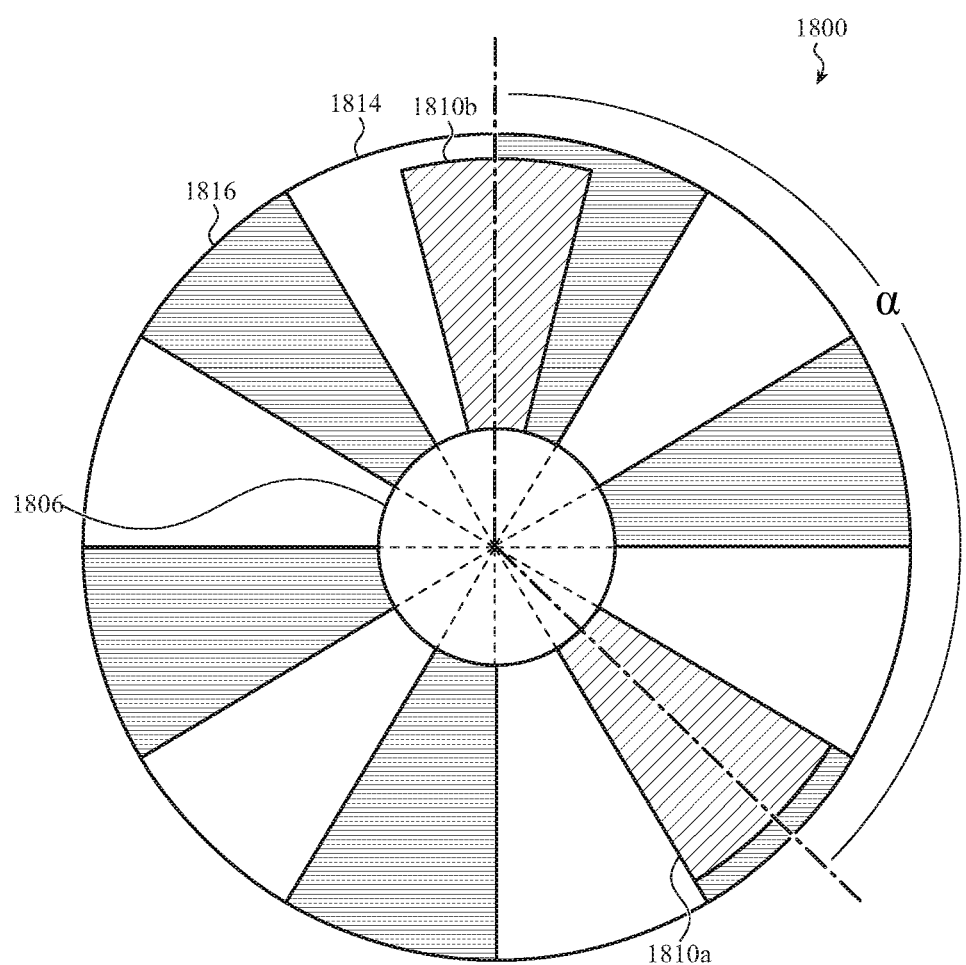
FIG. 19 shows a top view of a portion of the rotary encoder of FIG. 18.

In a particular example, as shown in FIG. 19, a capacitive member 1810a of the rotary encoder 1800 may substantially overlap a capacitance sensor 1816, at an example angle θ of rotation. Accordingly, the capacitance sensor 1816 which substantially aligns with capacitive member 1810a in FIG. 19 may detect a maximum capacitance of the capacitive member 1810a. Conversely, the capacitive member 1810b in FIG. 19 overlaps only a portion of the capacitance sensor 1816. Therefore, the capacitance sensor corresponding to capacitive member 1810*b* may sense a capacitance between zero and the maximum capacitance of the capacitive member 1810*b*. As shown in FIG. 19, the capacitive member 1810*a*, 1810*b* may be separated by an angle α. Analogous to the angle α described with respect to FIG. 4, the angle α may be chosen to ensure that the first and second 1801*a*, 1801*b* output signals in quadrature, or output signals whose phases are offset by a preset amount (such as a predetermined offset).

Figure 20A:
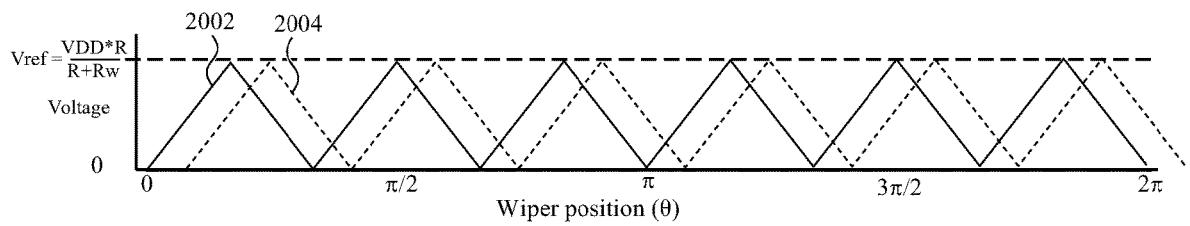
FIGS. 20A-20B show sample capacitance vs. position graphs of the rotary encoder of FIG. 18.

FIG. 20 illustrates an exemplary plot of the digitized output of the capacitance sensors 1816 as a function of rotation angle Θ of capacitive members 1810*a, b* around the shaft 1806 (or other user-rotatable element). Similar to the embodiment of FIG. 3 discussed above, the angle α between the first capacitive member 1810*a* and the second capacitive member 1810*b* may be chosen to ensure that the capacitance signals recorded are in quadrature. The outputs of capacitance sensors 1816 may be digitized by m-bit ADCs as discussed above with respect to FIGS. 5A and 5B and 6A and 6B and plotted as voltages cycling between zero and Vref as a function of wiper position Θ around the axis of the shaft 1806. Plot 2002 is a plot of a digital voltage Wd1 of the first capacitive member 1810*a*, and plot 2004 is a plot of a digital voltage Wd2 of the second capacitive member 1810*b*. As shown in FIG. 20A, as the shaft 1806 rotates, the signals Wd1 and Wd2 vary between zero and Vref.

The plots 2002 and 2004, corresponding to Wd1 and Wd2 respectively, are out of phase by a predetermined offset and thus considered to be in quadrature. The amount of quadrature (e.g., the predetermined offset) may result from the angle α between the first and second capacitive members 1810*a, b*. By determining the phase difference between plots 2002 and 2004, the rotational direction around the shaft 1806 can be determined.

Figure 20B:
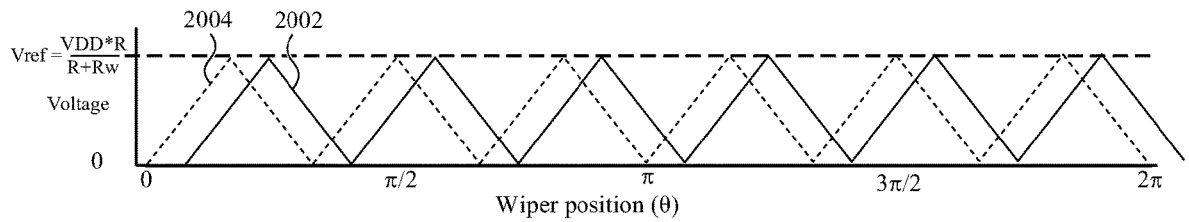

FIG. 20A is a leading plot 2004 (e.g., the signals are positively out of phase). Accordingly, FIG. 20A illustrates the capacitive members' outputs as the shaft 1806 rotates in a first direction (clockwise in FIG. 19). Similarly, FIG. 20B is a lagging plot 2004 (e.g., the signals are negatively out of phase). Thus, FIG. 20B reflects rotation of the shaft 1806 in a second direction (counter-clockwise in FIG. 19).

Figure 21:
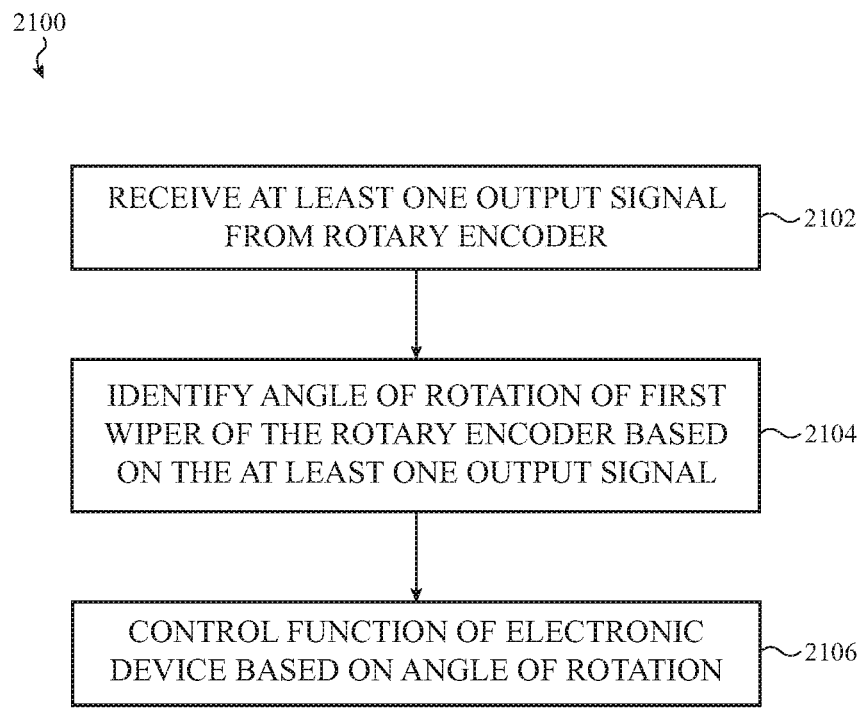
FIG. 21 illustrates a method that may be performed to control a function of an electronic device based on an angle of rotation of a wiper of a rotary encoder about an axis of a rotatable element of the rotary encoder.

FIG. 21 illustrates a method 2100 that may be performed to control a function of an electronic device (e.g., the electronic device 100 of FIG. 1) based on an angle of rotation of a first wiper of a rotary encoder about an axis of a user-rotatable element (e.g., a shaft) of the rotary encoder. The first wiper may be affixed to the user-rotatable element and in contact a resistance member (e.g., a resistive track) or a conductive output track of the rotary encoder. The method 2100 may be performed by a processor. In some examples, the rotary encoder may be any of the rotary encoders described in the present disclosure, or any rotary encoder that incorporates aspects of the rotary encoders described in the present disclosure.

At block 2102, the operation(s) may include receiving at least one output signal from the rotary encoder. The output signal(s) may include one or more voltages at one or more contact points between the first wiper and the resistance member or conductive output track (e.g., the signals or voltages output by any of the rotary encoders described with reference to FIGS. 1-20).

At block 2104, the operation(s) may include identifying, based on the at least one output signal, the angle of rotation of the first wiper of the rotary encoder about the axis of the rotatable element of the rotary encoder.

At block 2106, the operation(s) may include controlling a function of the electronic device based on the angle of rotation.

In some examples of the method 2100, the at least one output signal may include a first variable voltage associated with contact between the first wiper and the resistance member and a second variable voltage associated with contact between a second wiper of the rotary encoder and another resistance member (e.g., another resistive track) of the rotary encoder (e.g., the voltages output by the rotary encoder described with reference to FIGS. 9-12). The second wiper may also be affixed to the user-rotatable element, and the first variable voltage may be out of phase with the second variable voltage by a predetermined offset. In these examples, identifying the angle of rotation may include comparing the first variable voltage to the second variable voltage. In some examples, the method 2100 may further include a direction of rotation or speed of rotation of the user-rotatable element based on the first variable voltage, the second variable voltage, and the predetermined offset.

In some examples of the method 2100, the at least one output signal may include a variable voltage and a reference voltage (e.g., the voltages output by the rotary encoder described with reference to FIGS. 15-17). The variable voltage may be associated with contact between the first wiper and the conductive output track, contact between a second wiper of the rotary encoder and the resistance member, and contact between a third wiper and the resistance member. The second wiper and the third wiper may be affixed to the user-rotatable element. The reference voltage may be associated with a reference voltage output coupled to the resistance member. In these examples, identifying the angle of rotation may include comparing the variable voltage to the reference voltage.

FIGS. 22A-24B generally depict examples of manipulating graphics displayed on an electronic device through inputs provided by rotating a crown of the device. This manipulation (e.g., selection, acknowledgement, motion, dismissal, magnification, and so on) of a graphic may result in changes in operation of the electronic device and/or graphics displayed by the electronic device. Although specific examples are provided and discussed, many operations may be performed by rotating and/or translating a crown incorporating a rotary encoder. Accordingly, the following discussion is by way of example and not limitation.

Figure 22A:
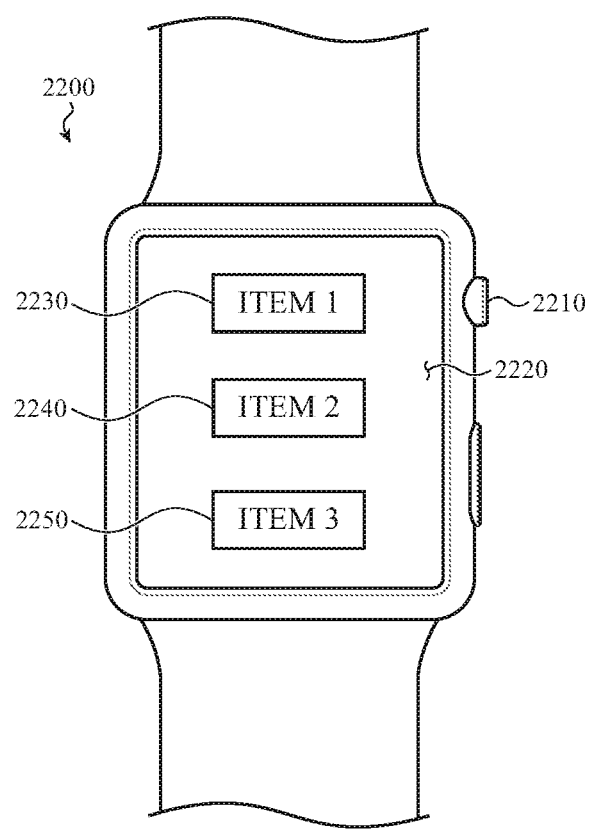
FIG. 22A illustrates a list, displayed on an electronic device, that may be controlled by rotation of a crown.

FIG. 22A depicts a sample electronic device 2200 (shown here as an electronic watch) having a rotatable crown 2210. The rotatable crown 2210 may be, or incorporate, any rotary encoder described herein. A display 2220 shows information and/or other graphics. In the current example, the display 2220 depicts a list of various items 2230, 2240, 2250, all of which are example graphics.

Figure 22B:
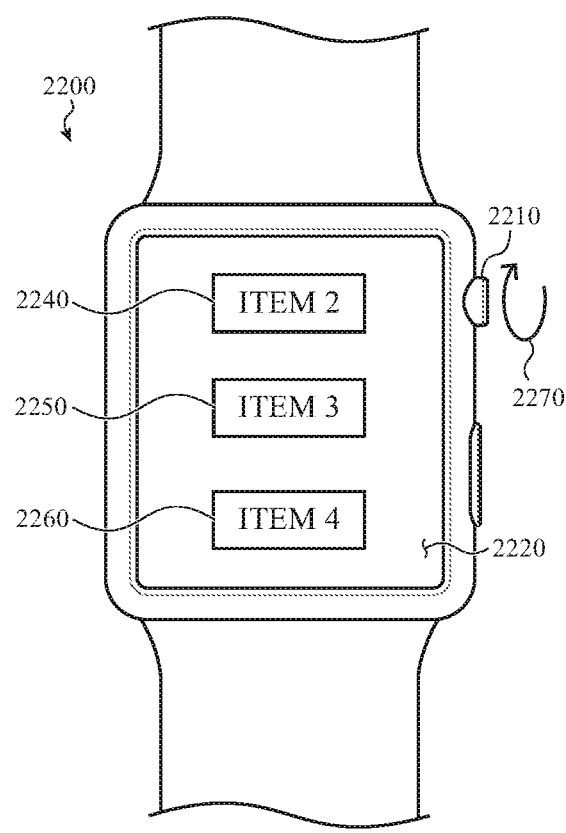
FIG. 22B illustrates the list of FIG. 22A, changed in response to rotation of the crown.

FIG. 22B illustrates how the graphics shown on the display 2220 change as the crown 2210 rotates (as indicated by the arrow 2270). Rotating the crown 2210 causes the list to scroll or otherwise move on the screen, such that the first item 2230 is no longer displayed, the second and third items 2240, 2250 each move upwards on the display, and a fourth item 2260 is now shown at the bottom of the display. This is one example of a scrolling operation that can be executed by rotating the crown 2210. Such scrolling operations may provide a simple and efficient way to depict multiple items relatively quickly and in sequential order. A speed of the scrolling operation may be controlled by the speed at which the crown 2210 is rotated—faster rotation may yield faster scrolling, while slower rotation yields slower scrolling. The crown 2210 may be translated (e.g., pushed inward toward the display 2220 or watch body) to select an item from the list, in certain embodiments.

Figure 23A:
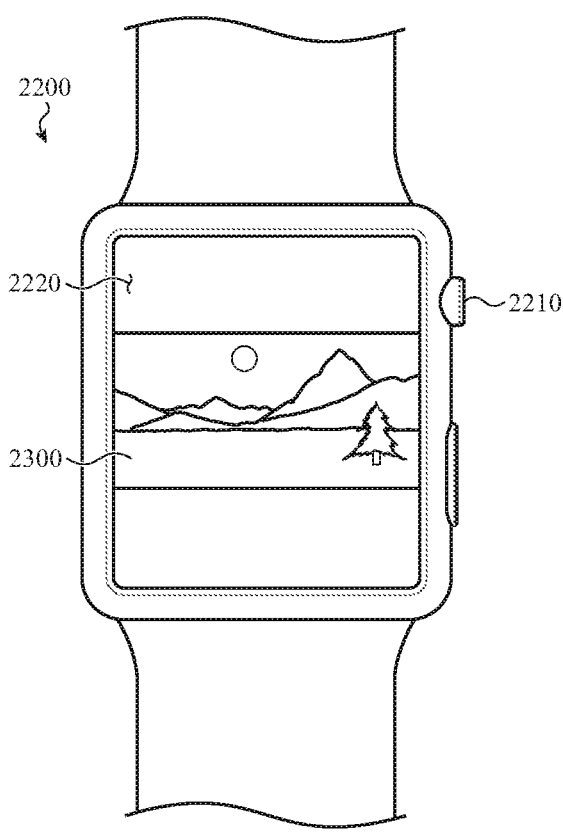
FIG. 23A illustrates an electronic device displaying a picture, the magnification of which may be controlled by rotation of a crown.
Figure 23B:
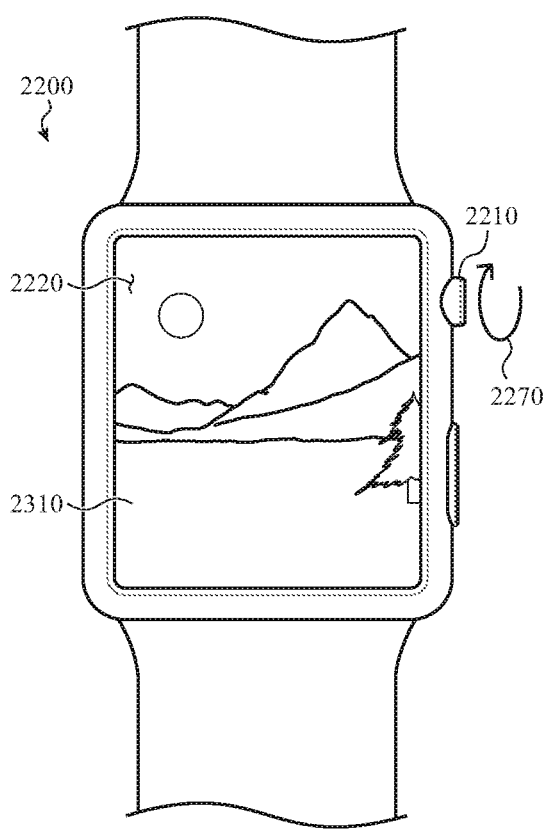
FIG. 23B illustrates the picture of FIG. 23A, changed in response to rotation of the crown.

FIGS. 23A-23B illustrate an example zoom operation. The display 2220 depicts a picture 2300 at a first magnification, shown in FIG. 23A; the picture 2300 is yet another example of a graphic. As the crown 2210 of the electronic watch 2200 rotates (again, illustrated by arrow 2270), the display may zoom into the picture, such that a portion 2310 of the picture is shown at an increased magnification. This is shown in FIG. 23B. The direction of zoom (in vs. out) and speed of zoom, or location of zoom, may be controlled through rotation of the crown 2210, and particularly through the direction of rotation and/or speed of rotation. Rotating the crown in a first direction may zoom in, while rotating the crown in an opposite direction may zoom out. Alternately, rotating the crown in a first direction may change the portion of the picture subject to the zoom effect. In some embodiments, pressing the crown may toggle between different zoom modes or inputs (e.g., direction of zoom vs. portion of picture subject to zoom). In yet other embodiments, pressing the crown may return the picture 2300 to the default magnification shown in FIG. 23A.

Figure 24A:
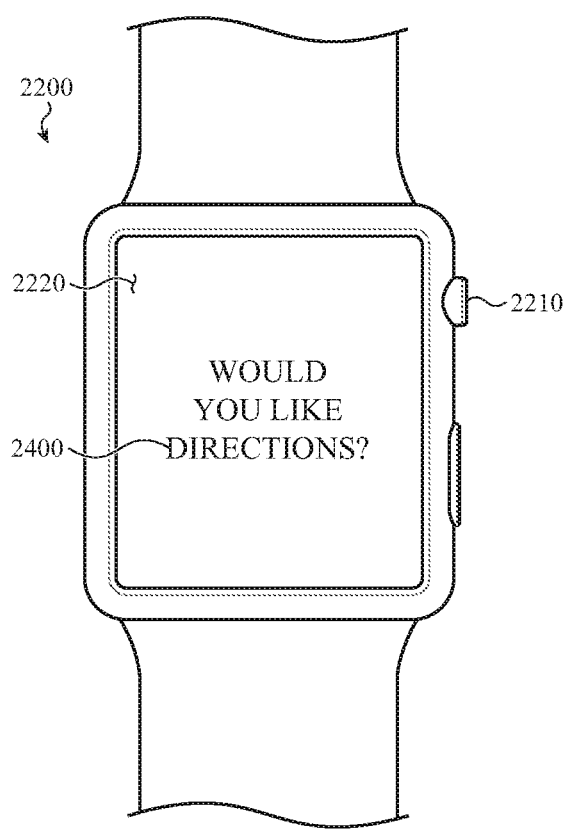
FIG. 24A illustrates an electronic device displaying a question that may be answered by rotating a crown.
Figure 24B:
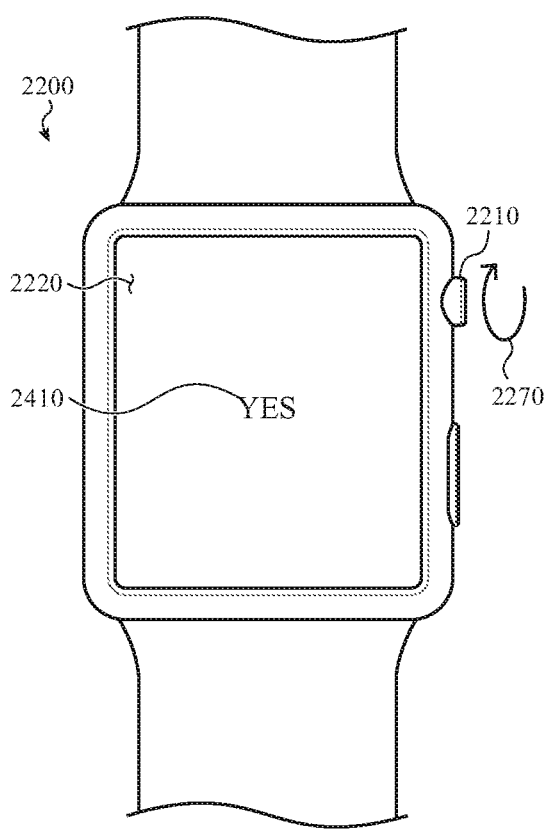
FIG. 24B illustrates the electronic device of FIG. 23A, with the question answered through rotation of the crown.

FIGS. 24A-24B illustrate possible use of the crown 2210 to change an operational state of the electronic watch 2200 or otherwise toggle between inputs. Turning first to FIG. 24A, the display 2220 depicts a question 2400, namely, "Would you like directions?" As shown in FIG. 24B, the crown 2210 may be rotated (again, illustrated by arrow 2270) to answer the question. Rotating the crown provides an input interpreted by the electronic watch 2200 as "yes," and so "YES" is displayed as a graphic 2410 on the display 2220. Rotating the crown 2210 in an opposite direction may provide a "no" input.

In the embodiment shown in FIGS. 24A-24B, the crown's rotation is used to directly provide the input, rather than select from options in a list (as discussed above with respect to FIGS. 22A-22B).

As mentioned previously, rotational input from a crown of an electronic device may control many functions beyond those listed here. The crown may rotate to adjust a volume of an electronic device, a brightness of a display, or other operational parameters of the device. The crown may rotate to turn a display on or off, or turn the device on or off. The crown may rotate to launch or terminate an application on the electronic device. Further, translational input of the crown may likewise initiate or control any of the foregoing functions, as well.

The foregoing description, for purposes of explanation, used specific nomenclature to provide a thorough understanding of the described embodiments. However, it will be apparent to one skilled in the art that the specific details are not required in order to practice the described embodiments. For example, certain embodiments may employ a resistive track, output track, and/or resistance member that is substantially flat. However, this need not be the case. Embodiments may employ tracks and/or members that vary in the Z dimension as well as within an X-Y plane. Some such tracks/members may have raised or lowered portions in order to facilitate electrical routing, provide space for other components of the embodiment or other components in an electronic device housing the embodiment, to ensure or enhance contact between a wiper and the member or track in a specific region, and so on. Accordingly, it should be understood that any and all of the embodiments described herein may have non-planar tracks or other members.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic watch comprising:
   a housing;
   a display positioned at least partially within the housing;
   a crown coupled to the housing and configured to receive rotational and translational inputs, the crown comprising:
      a shaft configured to rotate in response to a rotational input;
      a resistance member defining at least a portion of a contact surface and configured to remain stationary relative to the shaft;
      an electrical sink conductively coupled to the resistance member to define a fixed reference point along the resistance member; and
      a contact member coupled to the shaft and configured to rotate in conjunction with the shaft, the contact member in contact with the contact surface of the resistance member at a contact point that changes as the shaft rotates; and
   a processor configured to:
      cause an input voltage to be applied to the contact member;
      receive an output signal corresponding to an output voltage, wherein the output voltage varies based on a location of the contact point along the resistance member;
      determine an angular position, a direction of rotation, or a speed of rotation of the shaft using the output signal; and
      vary a graphic shown on the display in accordance with the determined angular position, direction of rotation, or speed of rotation of the shaft.

2. The electronic watch of claim 1, wherein:
   the crown further comprises a dome switch; and
   the shaft is translatable and has an end configured to depress the dome switch in response to translating.

3. The electronic watch of claim 1, wherein:
   the resistance member defines a voltage region between the contact point of the contact member and the fixed reference point;
   the output signal comprises a voltage drop measured across the voltage region between the contact point and the fixed reference point; and
   a resistance of the voltage region between the contact point and the fixed reference point changes as the location of the contact point changes, thereby changing the voltage drop.

4. The electronic watch of claim 1, wherein:
   the contact member is a first contact member;
   the contact point is a first contact point;
   the location is a first location;
   the crown further comprises a second contact member coupled to the shaft and configured to rotate in conjunction with the shaft, the contact member contacting the contact surface at a second contact point that changes as the shaft rotates;
   the resistance member comprises a first segment and a second segment separated by the fixed reference point;
   the resistance member defines:

a first voltage region between the first contact point and the fixed reference point; and a second voltage region between the second contact point and the fixed reference point;

the output signal comprises a first voltage drop measured across the first voltage region and a second voltage drop measured across the second voltage region;

a first resistance of the first voltage region changes as the first location of the first contact point changes, thereby changing the first voltage drop; and a second resistance of the second voltage region changes as a second location of the second contact point changes, thereby changing the second voltage drop.

5. The electronic watch of claim 1, wherein the processor is further configured to change a volume of an audio output based at least in part on the angular position of the shaft.

6. The electronic watch of claim 1, wherein varying the graphic shown on the display comprises scrolling graphical objects across the display.

7. The electronic watch of claim 1, wherein:
the electrical sink is a first electrical sink;
the fixed reference point is a first fixed reference point;
the output signal is a first output signal;
the output voltage is a first output voltage;
the crown further comprises a second electrical sink conductively coupled to the resistance member to define a second fixed reference point along the resistance member; and
the processor is further configured to receive a second output signal corresponding to a second output voltage between the contact point and the second fixed reference point, wherein the second output voltage varies based on a location of the contact point along the resistance member.

8. The electronic watch of claim 1, wherein the input voltage is applied to the contact member via a conductive path extending through the shaft.

9. An electronic watch comprising:
a housing;
a display positioned at least partially within the housing and configured to provide a graphical output;
a crown comprising:
  a shaft configured to rotate as the crown receives a rotational input and translate as the crown receives a translational input;
  a tactile switch configured to depress in response to translation of the shaft;
  a resistance member configured to remain stationary relative to the shaft;
  an electrical sink conductively coupled to the resistance member to define a fixed reference point along the resistance member;
  a contact member configured to slide along the resistance member when the shaft is rotated, the contact member in contact with the resistance member at a contact point that changes as the shaft is rotated; and
a processor positioned within the housing and operably coupled to the contact member and the display, the processor configured to:
  cause an input voltage to be applied to the contact member;
  determine an angular position, a direction of rotation, or a speed of rotation of the crown using an output signal, wherein the output signal corresponds to an output voltage between the contact point and the fixed reference point, wherein the output voltage varies based on a location of the contact point along the resistance member; and
  vary the graphical output of the display according to the determined angular position, direction of rotation, or speed of rotation of the crown.

10. The electronic watch of claim 9, wherein the processor is further configured to vary a haptic output of the electronic watch according to the determined angular position, direction of rotation, or speed of rotation of the crown.

11. The electronic watch of claim 9, wherein the processor is further configured to vary a volume of an audio output of the electronic watch according to the determined angular position, direction of rotation, or speed of rotation of the crown.

12. The electronic watch of claim 9, wherein:
the contact member is coupled to the shaft.

13. The electronic watch of claim 12, wherein:
the resistance member defines a resistance between the contact point and the fixed reference point;
the resistance changes as the location of the contact point changes, thereby causing the output voltage to change.

14. The electronic watch of claim 12, wherein:
the contact member is a first contact member; and
the crown further comprises a second contact member coupled to the shaft and configured to travel along the resistance member as the shaft rotates.

15. The electronic watch of claim 9, wherein:
the contact member is conductively coupled to the shaft; and
the input voltage is applied to the contact member via a conductive path extending through the shaft.

16. A crown for an electronic watch, comprising:
a resistance member;
an electrical sink conductively coupled to the resistance member to define a fixed reference point along the resistance member;
a shaft configured to translate and rotate relative to the contact surface; and
a contact member fixed with respect to the shaft and configured to contact the resistance member at a contact point that moves along the resistance member as the shaft rotates, thereby changing an electrical parameter of a conductive path from the contact point to the fixed reference point; wherein:
a processor of the electronic watch is configured to:
  cause an input voltage to be applied to the contact member;
  receive an output signal corresponding to the electrical parameter of the conductive path from the contact point to the fixed reference point;
  determine at least one of an angular position, a direction of rotation, or a speed of rotation of the shaft based on the output signal; and
  vary at least one of a graphical output, a haptic output, or an audio output of the electronic watch based on the at least one of the angular position, the direction of rotation, or the speed of rotation of the shaft.

17. The crown of claim 16, wherein the crown further comprises a tactile switch configured to activate when the shaft translates to detect a translational input.

18. The crown of claim 17, wherein the tactile switch comprises a dome switch.

19. The crown of claim 17, wherein the processor is further configured to vary at least one of the graphical output, the haptic output, or the audio output of the electronic watch in response to the translational input detected by the tactile switch.

20. The crown of claim 16, wherein:
the electrical parameter is electrical resistance; and
a change in a position of the contact member along the resistance member changes a measured resistance of the resistance member.

21. The crown of claim 16, wherein:
the contact member is conductively coupled to the shaft; and
the input voltage is applied to the contact member via a conductive path extending through the shaft.

* * * * *